(12) United States Patent
Zhu et al.

(10) Patent No.: US 12,244,811 B2
(45) Date of Patent: Mar. 4, 2025

(54) COMBINED SCREEN CONTENT CODING MODE

(71) Applicants: Beijing Bytedance Network Technology Co., Ltd., Beijing (CN); Bytedance Inc., Los Angeles, CA (US)

(72) Inventors: Weijia Zhu, San Diego, CA (US); Jizheng Xu, San Diego, CA (US); Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 461 days.

(21) Appl. No.: 17/470,095

(22) Filed: Sep. 9, 2021

(65) Prior Publication Data

US 2023/0007261 A1 Jan. 5, 2023

Related U.S. Application Data

(63) Continuation of application No. PCT/CN2020/078536, filed on Mar. 10, 2020.

(30) Foreign Application Priority Data

Mar. 10, 2019 (WO) ................ PCT/CN2019/000051
Mar. 14, 2019 (WO) ................ PCT/CN2019/078148
(Continued)

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11);
(Continued)

(58) Field of Classification Search
CPC .. H04N 19/105; H04N 19/119; H04N 19/132; H04N 19/159; H04N 19/174;
(Continued)

(56) References Cited

U.S. PATENT DOCUMENTS

2015/0365671 A1* 12/2015 Pu ........................... H04N 19/46
375/240.03
2016/0057447 A1* 2/2016 Pu ........................ H04N 19/186
375/240.12
(Continued)

FOREIGN PATENT DOCUMENTS

CN 106464866 A 2/2017
CN 106576174 A 4/2017
(Continued)

OTHER PUBLICATIONS

Sun et al. ("CE8: Palette mode and intra mode combination (Test8.2.2)", Joint Video Experts Team (JVET) of ITU-T SG 16 WP 3 and ISO/IEC JTC 1/SC 29/WG 11; 13th Meeting: Marrakech, MA, Jan. 9-18, 2019; Document: JVET-M0051) (Year: 2019).*
(Continued)

*Primary Examiner* — Maria E Vazquez Colon
(74) *Attorney, Agent, or Firm* — Conley Rose, P.C.

(57) ABSTRACT

A method of visual media processing video, includes determining that palette mode is to be used for processing a first portion of a video block and intra block copy (IBC) mode is to be used for processing a second portion of the video block, and performing further processing of the first portion of the video block using the palette mode and the second portion of the video using the IBC mode, wherein indica-
(Continued)

tions of the first portion of the video block processed using the palette mode and indications of the second portion of the video block processed using the IBC mode are included in a palette index identifying the first portion of the video block and the second portion of the video block.

13 Claims, 12 Drawing Sheets

(30) Foreign Application Priority Data

| Apr. 9, 2019 | (WO) | ................ | PCT/CN2019/081933 |
| May 25, 2019 | (WO) | ................ | PCT/CN2019/088453 |
| Sep. 18, 2019 | (WO) | ................ | PCT/CN2019/106487 |

(51) Int. Cl.
| *H04N 19/159* | (2014.01) |
| *H04N 19/176* | (2014.01) |
| *H04N 19/186* | (2014.01) |
| *H04N 19/46* | (2014.01) |
| *H04N 19/70* | (2014.01) |

(52) U.S. Cl.
CPC ......... *H04N 19/176* (2014.11); *H04N 19/186* (2014.11); *H04N 19/46* (2014.11); *H04N 19/70* (2014.11)

(58) Field of Classification Search
CPC .... H04N 19/176; H04N 19/186; H04N 19/46; H04N 19/52; H04N 19/593; H04N 19/70
See application file for complete search history.

(56) References Cited

U.S. PATENT DOCUMENTS

| 2017/0099495 | A1* | 4/2017 | Rapaka | ................ | H04N 19/523 |
| 2018/0109798 | A1* | 4/2018 | Lee | ................ | H04N 19/593 |

FOREIGN PATENT DOCUMENTS

| CN | 106797457 | A | 5/2017 |
| CN | 106797478 | A | 5/2017 |
| CN | 107409227 | A | 11/2017 |
| CN | 107431795 | A | 12/2017 |
| WO | 2015176690 | A1 | 11/2015 |
| WO | 2015179898 | A1 | 12/2015 |
| WO | 2016070845 | A | 5/2016 |
| WO | 2017058633 | A1 | 4/2017 |

OTHER PUBLICATIONS

Bross et al. ""Versatile Video Coding (Draft 4),"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M1001, 2019.

Bross et al. ""Versatile Video Coding (Draft 6),"" Joint Video Experts Team (JVET)of ITU-T SG 16 WP 3 and ISO/IEC ITC 1/SC 29/WG 1115th Meeting: Gothenburg, SE, Jul. 3-12, 2019, document JVET-O2001, 2019.

"Information Technology—High Efficiency Coding and Media Delivery in Heterogeneous Environments—Part 2: High Efficiency Video Coding" Apr. 20, 2018, ISO/DIS 23008, 4th Edition.

Sun et al. ""AHG11: Palette Mode,"" oint Video Experts Team (JVET) of ITU-T SG 16 WP 3 and ISO/IEC JTC 1/SC 29/WG 1111th Meeting: Ljubljana, SI, Jul. 10-18, 2018, document JVET-K0411, 2018.

Sun et al. ""CE15-Related: Combination of Palette Mode and Intra Prediction,"" Joint Video Experts Team (JVET)of ITU-T SG 16 WP 3 and ISO/IEC JTC 1/SC 29/WG 1112th Meeting: Macao, CN, Oct. 3-12, 2018, document JVET-L0213, 2018.

Sun et al. ""CE8: Palette Mode and Intra Mode Combination (Test 8.2.2),"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0051, 2019.

http:// phenix.it-sudparis.eu/jvet/doc_end_user/current_document.php?id=5755.

http://vcgit.hhi.fraunhofer.de/jvet/VVCSoftware_VTM/tags/VTM-4.0.

International Search Report and Written Opinion from International Patent Application No. PCT/CN2020/078536 dated May 27, 2020 (10 pages).

Document: JVET-N0259-v1, Zhu, W., et al., "CE8-related: Compound Palette Mode," Joint Video Experts Team (JVET) of ITU-T SG 16 WP 3 and ISO/IEC JTC 1/SC 29/WG 11 14th Meeting: Geneva, CH, Mar. 19-27, 2019, 14 pages.

Document: JVET-P0230-v1, Zhu, W., et al., "CE8-1.2-related: Compound palette mode with signalled merge index," Joint Video Experts Team (JVET) of ITU-T SG 16 WP 3 and ISO/IEC JTC 1/SC 29/WG 11 16th Meeting: Geneva, CH, Oct. 1-11, 2019, 8 pages.

Document: JVET-P0055-v1, Zhu, W., et al., "CE8-1.2: Compound Palette Mode," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.

Chinese Notice of Allowance from Chinese Patent Application No. 202080000553.0 dated Oct. 31, 2024, 27 pages.

* cited by examiner

Example of a block coded in palette mode previous palette

| Index | G/Y | B/Cb | R/Cr |
|---|---|---|---|
| 0 | G0 | B0 | R0 |
| 1 | G1 | B1 | R1 |
| 2 | G2 | B2 | R2 |
| 3 | G3 | B3 | R3 |
| 4 | G4 | B4 | R4 |
| 5 | G5 | B5 | R5 | current palette

| Pred flag | Index | G/Y | B/Cb | R/Cr |
|---|---|---|---|---|
| 1 | 0 | G0 | B0 | R0 |
| 0 |   |   |   |   |
| 1 | 1 | G2 | B2 | R2 |
| 1 | 2 | G3 | B3 | R3 |
| 0 | 3 | G3N | B3N | R3N |
| 0 | 4 | G4N | B4N | R4N |

● Re-used palette entries (3)
○ New palette entries (2), signalled

Use of palette predictor to signal palette entries

FIG. 3

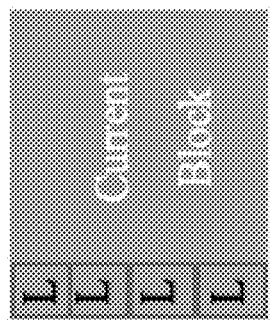
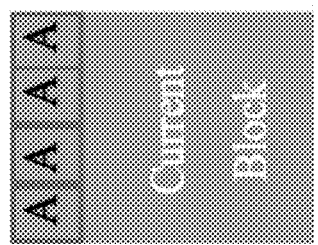
FIG. 9

1100

1102 — determining, for a conversion between a video block of visual media data and a bitstream representation of the video block, that palette mode is to be used for processing a first portion of the video block and intra block copy (IBC) mode is to be used for processing a second portion of the video block wherein, in the palette mode, samples of the first portion of the video block are coded according to a set of representative color values included in a predefined palette and wherein, in the IBC mode, samples of the second portion of the video block are predicted from adjacent pixels from neighboring, previously-decoded video blocks 1104 — performing, during the conversion, further processing of the first portion of the video block using the palette mode and further processing of the second portion of the video block based on a prediction block derived using the IBC mode, wherein indications of the first portion of the video block processed using the palette mode and indications of the second portion of the video block processed using the IBC mode are included in a palette index map that identifies the first portion of the video block and the second portion of the video block

FIG. 11

COMBINED SCREEN CONTENT CODING MODE

CROSS REFERENCE TO RELATED APPLICATIONS

This application is a continuation of International Patent Application No. PCT/CN2020/078536, filed on Mar. 10, 2020, which claims the priority to and benefits of International Patent Application No. PCT/CN2019/000051, filed on Mar. 10, 2019, International Patent Application No. PCT/CN2019/078148, filed on Mar. 14, 2019, International Patent Application No. PCT/CN2019/081933, filed on Apr. 9, 2019, International Patent Application No. PCT/CN2019/088453, filed on May 25, 2019, and International Patent Application No. PCT/CN2019/106487, filed on Sep. 18, 2019. The aforementioned applications are incorporated by reference as part of the disclosure of this application.

TECHNICAL FIELD

This document is related to video and image coding and decoding technologies, devices and systems.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document describes various embodiments and techniques for buffer management and block vector coding for intra block copy mode for decoding or encoding video or images.

In one example aspect, a method for visual media processing is disclosed. The method includes determining, for a conversion between a video block of visual media data and a bitstream representation of the video block, that palette mode is to be used for processing a first portion of the video block and intra block copy (IBC) mode is to be used for processing a second portion of the video block wherein, in the palette mode, samples of the first portion of the video block are coded according to a set of representative color values included in a predefined palette and wherein, in the IBC mode, samples of the second portion of the video block are predicted from adjacent pixels from neighboring, previously-decoded video blocks; and performing, during the conversion, further processing of the first portion of the video block using the palette mode and further processing of the second portion of the video block based on a prediction block derived using the IBC mode, wherein indications of the first portion of the video block processed using the palette mode and indications of the second portion of the video block processed using the IBC mode are included in a palette index map that identifies the first portion of the video block and the second portion of the video block.

In another example aspect, another method for visual media processing is disclosed. The method includes determining, for samples of a video block, that a first combined palette and intra block copy (IBC) mode are to be used for processing the samples, wherein, in the palette mode, the samples of the video block are coded according to a set of representative color values included in a predefined palette and wherein, in the IBC mode, the samples of the video block are predicted from adjacent pixels from neighboring, previously-decoded video blocks, wherein the samples of the video bock are associated with a palette index indicative of an INDEX mode or a COPY_ABOVE mode, wherein in the INDEX mode or in the COPY_ABOVE mode, the palette index of the current block is derived by copying a previously-coded index; and performing a conversion between the video block and a bitstream representation of the video block.

In yet another example aspect, a video encoder or decoder apparatus comprising a processor configured to implement an above described method is disclosed.

In another example aspect, a computer readable program medium is disclosed. The medium stores code that embodies processor executable instructions for implementing one of the disclosed methods.

These, and other, aspects are described in greater details in the present document.

BRIEF DESCRIPTION OF THE DRAWINGS

FIG. 3 shows an example of use of a palette predictor to signal palette entries.

FIG. 9 shows an example of above and left neighboring blocks of current block.

FIG. 11 is a flowchart of an example method of visual data processing.

DETAILED DESCRIPTION

1. Video Coding in HEVC/H.265

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC. The latest version of VVC draft, i.e., Versatile Video Coding (Draft 4) could be found at: http://phenix.it-sudparis.eudvet/doc_end_user/current_document.php?id=5755. The latest reference software of VVC, named VTM, could be found at: https://vcgit.hhi.fraunhoferdedvet/VVCSoftware_VTM/tags/VTM-4.0.

2.1. Intra Block Copy

Figure 1:
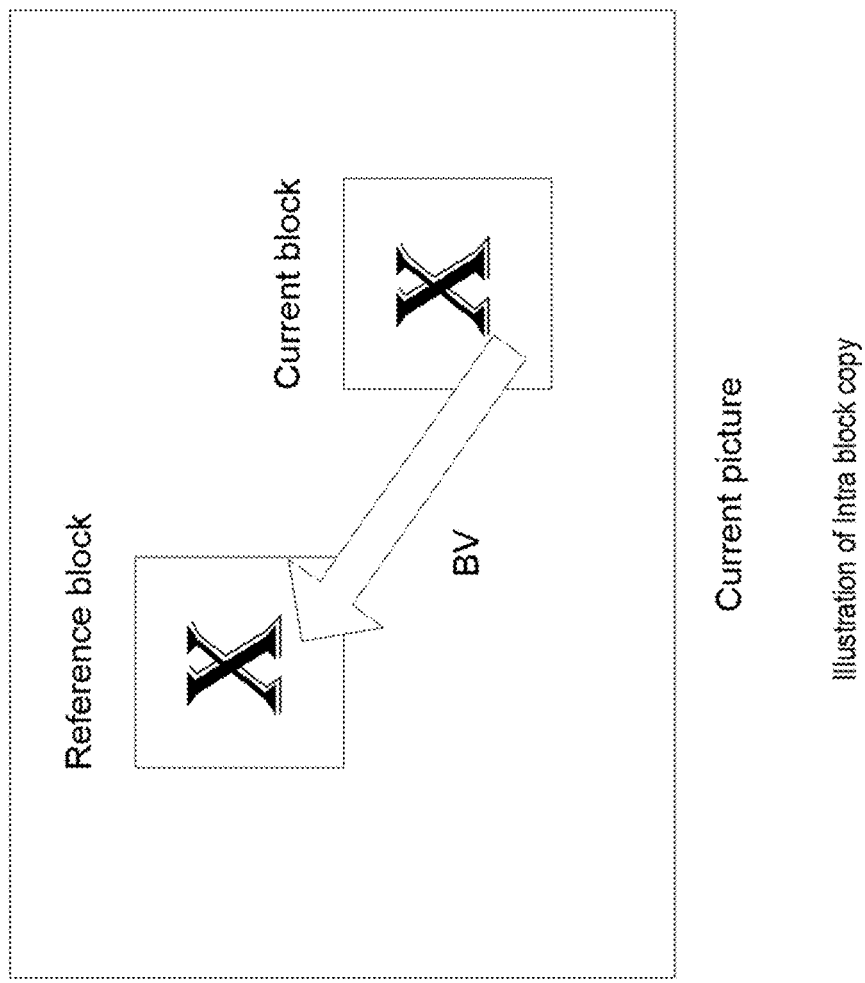
FIG. 1 shows an example of intra block copy.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g., in bitstream conformance. The other is to apply padding for those undefined pixel values. The following sub-sessions describe the solutions in detail.

2.2. IBC in HEVC Screen Content Coding Extensions

In the screen content coding extensions of HEVC, when a block uses current picture as reference, it should guarantee that the whole reference block is within the available reconstructed area, as indicated in the following text in the standards specification: The variables off setX and off setY are derived as follows:

$$\text{offset}X = (\text{ChromaArrayType}==0)?0:(\text{mv}CLX[0] \ \& \ 0x7?2:0) \quad (8\text{-}104)$$

$$\text{offset}Y = (\text{ChromaArrayType}==0)?0:(\text{mv}CLX[1] \ \& \ 0x7?2:0) \quad (8\text{-}105)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.

One or both of the following conditions shall be true:
The value of (mvLX[0]>>2)+nPbW+xB1+offsetX is less than or equal to 0.
The value of (mvLX[1]>>2)+nPbH+yB1+offsetY is less than or equal to 0.

The following condition shall be true:

$$(xPb+(\text{mv}LX[0]>>2)+nPbSw-1+\text{offset}X)/CtbSizeY-xCb/CtbSizeY<=yCb/CtbSizeY-(yPb+(\text{mv}LX[1]>>2)+nPbSh-1+\text{offset}Y)/CtbSizeY \quad (8\text{-}106)$$

Thus, the case that the reference block overlaps with the current block or the reference block is outside of the picture will not happen. There is no need to pad the reference or prediction block.

2.3. IBC in VVC Test Model

In the current VVC test model, i.e., VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1. IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of history-based motion vector prediction (HMVP) candidates
Step 3: Insertion of pairwise average candidates In the derivation of spatial merge candidates, a maximum of four merge candidates are selected among candidates located in the positions depicted in the figures. The order of derivation is A1, B1, B0, A0 and B2. Position B2 is considered only when any PU of position A1, B1, B0, A0 is not available (e.g., because it belongs to another slice or tile) or is not coded with IBC mode. After candidate at position A1 is added, the insertion of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in depicted in the figures are considered and a candidate is only added to the list if the corresponding candidate used for redundancy check has not the same motion information.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.2. IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
  Check $A_0$, $A_1$ until an available candidate is found.
  Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.4. Palette Mode

Figure 2:
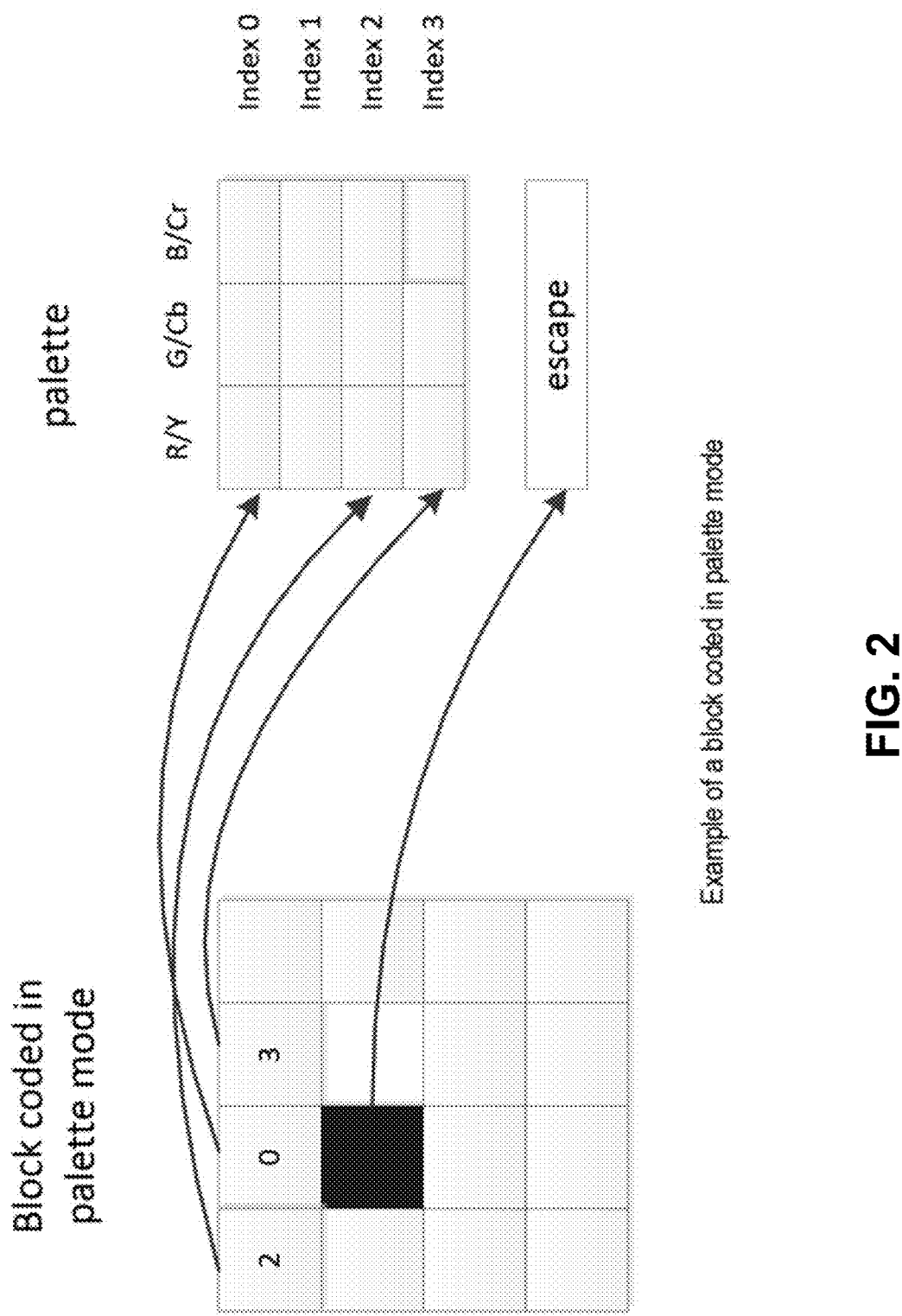
FIG. 2 shows an example of a block coded in palette mode.

The basic idea behind a palette mode is that the samples in the CU are represented by a small set of representative colour values. This set is referred to as the palette. It is also possible to indicate a sample that is outside the palette by signaling an escape symbol followed by (possibly quantized) component values. This is illustrated in FIG. 2.

2.5. Palette Mode in HEVC Screen Content Coding Extensions (HEVC-SCC)

In the palette mode in HEVC-SCC, a predictive way is used to code the palette and index map.

2.5.1. CODING OF THE PALETTE ENTRIES

For coding of the palette entries, a palette predictor is maintained. The maximum size of the palette as well as the palette predictor is signalled in the SPS. In HEVC-SCC, a palette_predictor_initializer_present_flag is introduced in the PPS. When this flag is 1, entries for initializing the palette predictor are signalled in the bitstream. The palette predictor is initialized at the beginning of each CTU row, each slice and each tile. Depending on the value of the palette_predictor_initializer_present_flag, the palette predictor is reset to 0 or initialized using the palette predictor intialzer entries signalled in the PPS. In HEVC-SCC, a palette predictor initializer of size 0 was enabled to allow explicit disabling of the palette predictor initialization at the PPS level.

For each entry in the palette predictor, a reuse flag is signalled to indicate whether it is part of the current palette. This is illustrated in FIG. 3. The reuse flags are sent using run-length coding of zeros. After this, the number of new palette entries are signalled using exponential Golomb code of order 0. Finally, the component values for the new palette entries are signalled.

2.5.2. Coding of Palette Indices

Figure 4:
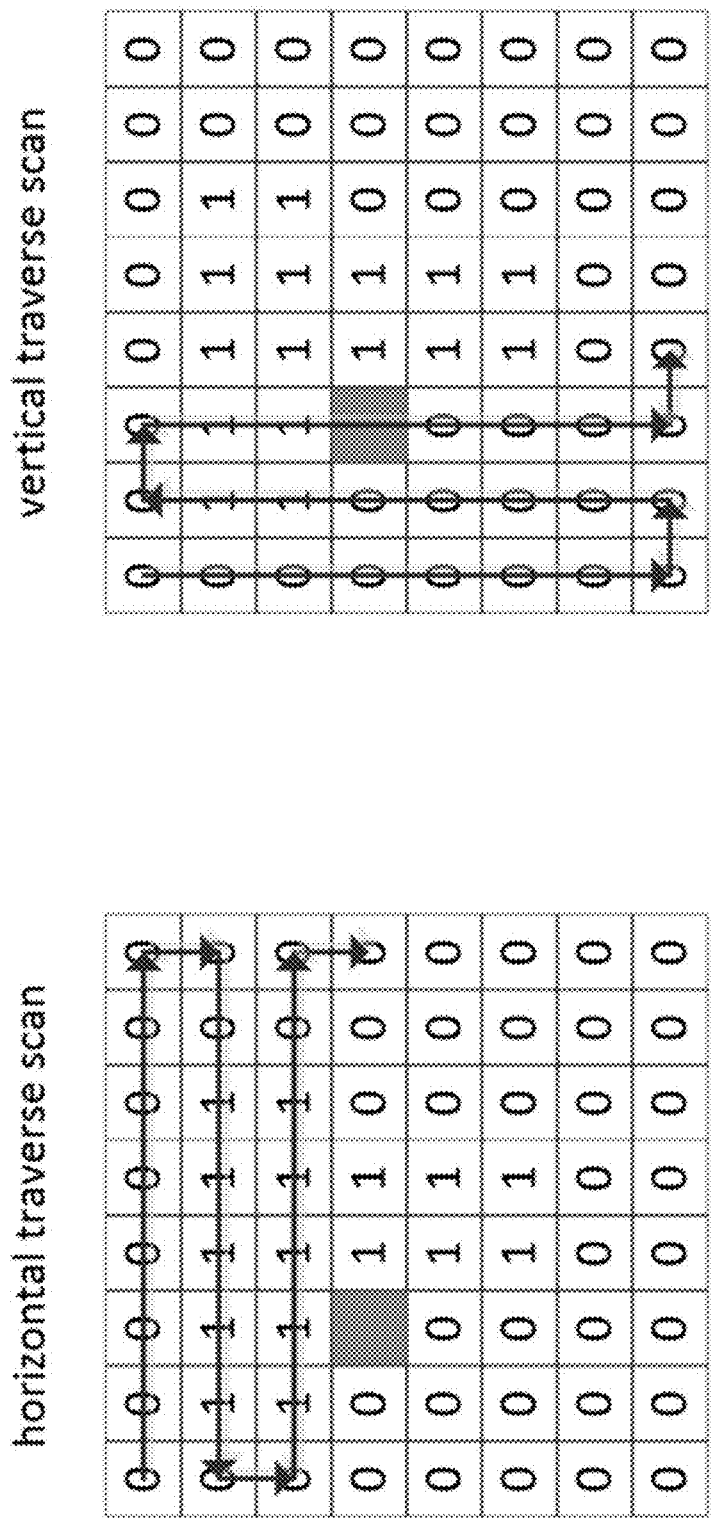
FIG. 4 shows an example of horizontal and vertical traverse scans.

The palette indices are coded using horizontal and vertical traverse scans as shown in FIG. 4. The scan order is explicitly signalled in the bitstream using the palette_transpose_flag. For the rest of the subsection it is assumed that the scan is horizontal.

Figure 5:
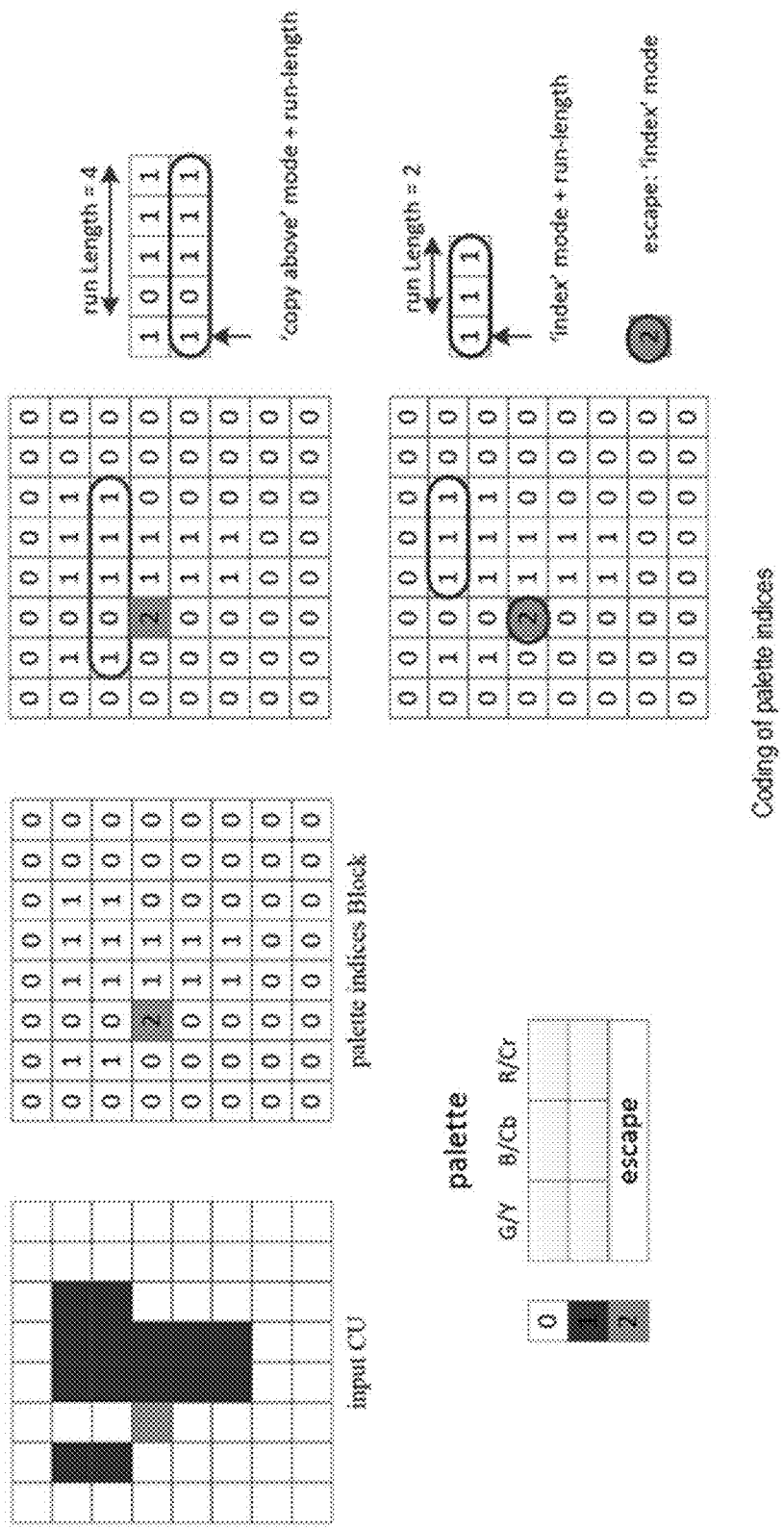
FIG. 5 shows an example of coding of palette indices.

The palette indices are coded using two main palette sample modes: 'INDEX' and 'COPY_ABOVE'. As explained previously, the escape symbol is also signalled as an 'INDEX' mode and assigned an index equal to the maximum palette size. The mode is signalled using a flag except for the top row or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number of subsequent samples that are also coded using the same mode. When escape symbol is part of the run in 'INDEX' or 'COPY_ABOVE' mode, the escape component values are signalled for each escape symbol. The coding of palette indices is illustrated in FIG. 5.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is enabled for 4:4:4, 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

2.6. Palette Mode Combining with Intra prediction (PCIP)

In JVET-M0051, the palette mode combined with intra prediction is proposed. In this scheme, the decoder first derives the prediction block based on the intra prediction methods. Then, the decoder decodes a palette and an index map. Using the decoding palette information, the decoder refines the prediction block and reconstructs the block.

Figure 8:
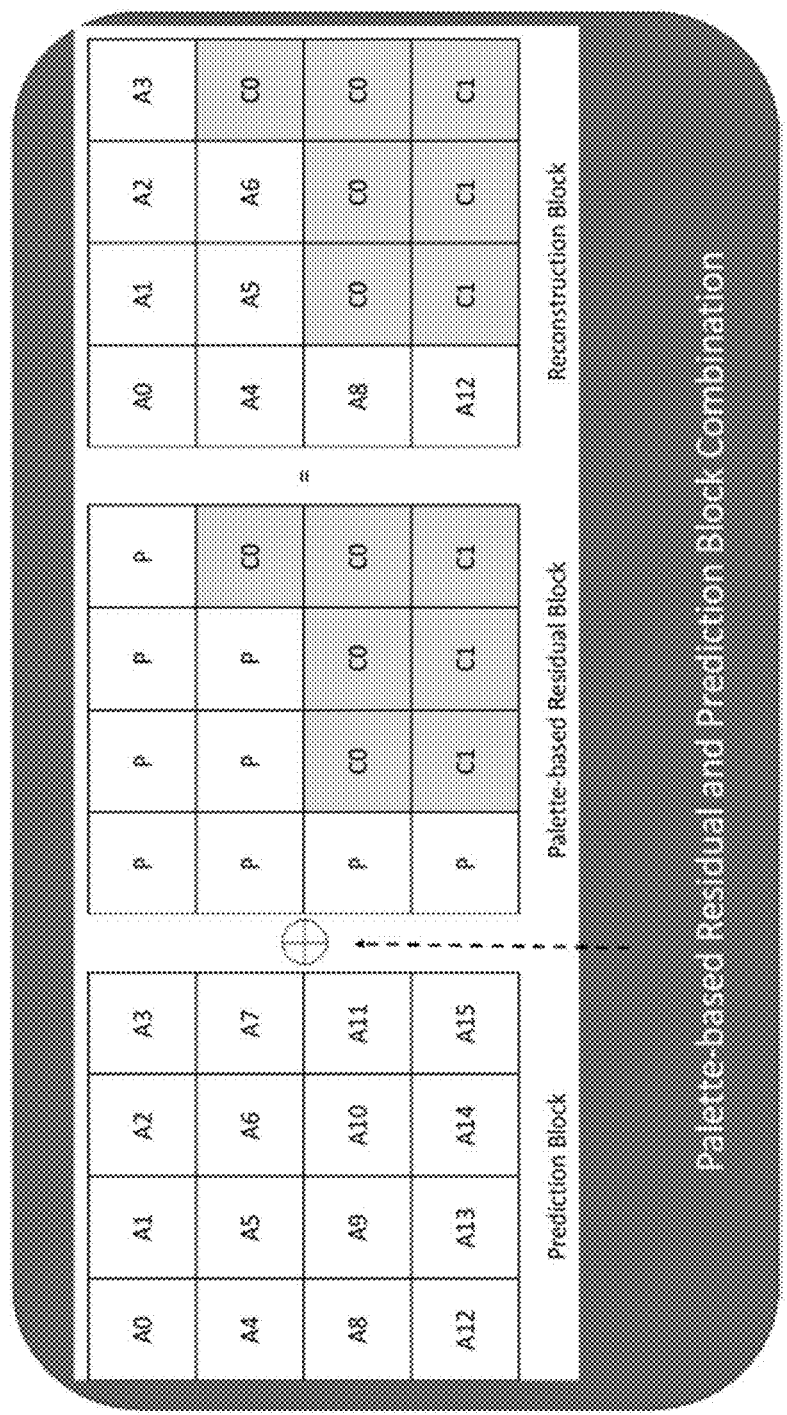
FIG. 8 is a pictorial depiction of a method that refines prediction block according to the palette information.

FIG. 8 shows an example combining the palette information and the intra prediction information. First, the decoder generates the prediction block (with pixel values A0-A15). And, the decoder decodes an index map in the palette mode. To reconstruct the block, if the decoded indices equal to "0", the corresponding pixels are marked as "P" as shown in FIG. 8. The pixels marked as "P" is reconstructed by pixel values in the intra prediction block. Otherwise, the pixels are reconstructed by palette colors, e.g., C0, C1.

3. Drawbacks of Existing Implementations

The palette mode only can use the samples inside the current block, which may limit its efficiency on screen content coding that usually shows non-local repeated patterns. It would be better if the palette mode can exploit both the local and non-local correlations.

4. Example Embodiments and Techniques

The embodiments detailed below should be considered as examples to explain general concepts. These embodiments should not be interpreted in a narrow way. Furthermore, these embodiments can be combined in any manner.

The proposed method is named Palette and Intra Block Copy Combined Prediction (PICP).

1. It is proposed to reconstruct one block with some samples are predicted from the IBC mode and some are predicted from the palette mode and the indication of which sample predicted from IBC or palette mode may be indicated by a specific palette index.
    a. In one example, the reconstructions in the palette mode may copy the collocated samples in IBC prediction.
    b. In one example, the indication of usage of copying from IBC prediction in the palette mode may be according to the index value in the index map.
        i. In one example, when the specific index value is 0, the current sample may be reconstructed by copying the collocated sample in the IBC prediction. Alternatively, furthermore, the current sample may be reconstructed by copying the collocated sample in the IBC prediction when the current index value is 0.
        ii. In one example, when the specific index value is equal to the number of palette entries minus 1, the current sample may be reconstructed by copying the collocated sample in the IBC prediction. Alternatively, furthermore, the current sample may be reconstructed by copying the collocated sample in the IBC prediction when the current index value is the number of palette entries minus 1.
        iii. In one example, when the specific index value is equal to T, the current sample may be reconstructed by copying the collocated sample in the IBC prediction. Alternatively, furthermore, the current sample may be reconstructed by copying the collocated sample in the IBC prediction when the current index value is T. In one example, T is an integer positive number. Alternatively, furthermore, in one example, T may be based on
            1) block dimension of current block
            2) Current quantization parameter of current block
            3) Indication of the color format (such as 4:2:0, 4:4:4)
            4) Separate/dual coding tree structure
            5) Slice/tile group type and/or picture type
            6) T is signaled in the bitstream
        iv. In one example, the number of consecutive sample/pixel values copied from IBC prediction may be signaled.
        v. In one example, the sample/pixel value copied from IBC prediction may be added as an entry to the palette predictor.
            1) Alternatively, in one example, the sample/pixel value copied from IBC prediction may be utilized to replace the existing entries in the palette predictor.
            2) Alternatively, furthermore, before adding the sample/pixel value copied from IBC prediction to the palette predictor, pruning may be applied to avoid duplicated sample/pixel values.
            3) In one example, the sample/pixel value copied from IBC prediction may be utilized to reorder entries in the palette predictor.
    c. In one example, the indication of usage of copying from IBC prediction in the palette mode may be derived from coded information. In such a case, it is not necessary to send a special index to indicate if IBC is used or not.
        i. In one example, for a chroma sample, if its co-located luma sample is coded in IBC mode, the sample may be inferred to be coded in IBC mode also.
        ii. In one example, for a chroma sample, if its co-located sample in other color component is coded in IBC mode, the sample may be inferred to be coded in IBC mode also.
    d. In one example, the indication of usage of copying from IBC prediction in the palette mode may be signaled (e.g., plt_combined_ibc_sample_flag).
        i. In one example, the current sample may be reconstructed by copying the collocated sample in the IBC prediction when the plt_combined_ibc_sample_flag is 1. Alternatively, furthermore, when the plt_combined_ibc_sample_flag is 1, the current sample may be reconstructed by copying the collocated sample in the IBC prediction.
        ii. In one example, the current sample may be reconstructed by copying the collocated sample in the IBC prediction, which may be based on the value of the plt_combined_ibc_sample_flag of the neighboring samples.
            1) In one example, plt_combined_ibc_sample_flag may be inferred to 0 if the current sample doesn't have neighboring samples.
            2) In one example, the value of current plt_combined_ibc_sample_flag may be derived based on plt_combined_ibc_sample_flag of its left and/or above neighbor.
            3) In one example, the current plt_combined_ibc_sample_flag may be 1 when the value of plt_combined_ibc_sample_flag of its left and/or above neighbor is 1. Alternatively, furthermore, when the value of plt_combined_ibc_sample_flag of its left and/or above neighbor is 1, the current plt_combined_ibc_sample_flag may be 1.
    e. In one example, the motion information of IBC prediction in the proposed method can be derived by the IBC merge mode or IBC AMVP mode.
        i. In one example, the IBC merge mode or IBC AMVP mode on large blocks may be employed in the proposed method
            1) In one example, large block may be defined as current_block.width>=T||current_block.height>=T, where the current_block.width and current_block.height denote the width and height of the current block respectively. T may be a fixed number (e.g., 16) and based on
                a) block dimension of current block
                b) Current quantization parameter of current block
                c) Indication of the color format (such as 4:2:0, 4:4:4)
                d) Separate/dual coding tree structure
                e) Slice/tile group type and/or picture type
                f) T is signaled in the bitstream
        ii. In one example, the IBC AMVP mode may be always employed in the proposed method.
        iii. In one example, the IBC merge mode may be always employed in the proposed method.

iv. In one example, the IBC merge mode may be always employed and only the first available merge candidate in the merge list may be always employed.
v. In one example, the first valid merge candidate in the IBC AMVP/merge list may be utilized in the proposed method to derive IBC prediction.
  1) Alternatively, if none of the candidates in the IBC AMVP/merge list is valid, a default block vector may be utilized instead.
    a) In one example, the default block vector may be pre-defined or based on the decoded information, such as block dimension and/or block position.
vi. In one example, the block vector to be utilized in the proposed method to derive IBC prediction may be derived or inherited from the HMVP table.
vii. In one example, the block vector to be utilized in the proposed method to derive IBC prediction may be derived or inherited from the IBC merge/AMVP candidates in the IBC merge/AMVP candidate list.
  1) Alternatively, indication of the block vector to be utilized in the proposed method to derive IBC prediction may be signaled in the bitstream.
    a) In one example, an index of IBC AMVP/merge candidate in the IBC AMVP/merge candidate list may be signaled.
    b) In one example, an index of valid IBC AMVP/merge candidate in the IBC AMVP/merge candidate list excluding invalid candidates may be signaled wherein only valid candidates are allowed to be selected.
viii. In one example, indication of the block vector to be utilized in the proposed method to derive IBC prediction may be signaled, such as BV difference compared to a candidate in the IBC merge/AMVP candidate list may be signaled.
ix. In one example, when dual tree is enabled, the IBC mode for chroma blocks may be modified as follows.
  1) In one example, the chroma motion vectors (block vectors) may be derived by scaling the collocated luma motion vectors (block vectors) based on the chroma format.
  2) In one example, the chroma motion vectors (block vectors) may be derived by scaling the neighboring motion vectors (block vectors) of the collocated luma blocks based on the chroma format.
  3) In one example, the motion vector (block vector) of each chroma sub blocks (e.g., 2×2) may be derived by averaging all available luma motion vectors based on the chroma format.
f. In one example, the indication of the usage of copying from IBC predictions in palette mode may be based on
  i. block dimension of current block
  ii. Current quantization parameter of current block
  iii. Indication of the color format (such as 4:2:0, 4:4:4)
  iv. Separate/dual coding tree structure
  v. Slice/tile group type and/or picture type
2. The reconstructions of escape pixels in the palette mode may be based on the collocated samples in IBC prediction.
  a. In one example, the residue between original samples and IBC predictions may be signalled for escape pixels.
  b. In one example, the quantized residue between original samples and IBC predictions may be signalled.
  c. In one example, the sign of the quantized residue between original samples and IBC predictions may be signalled.
3. The reconstructions of escape pixels in the palette mode may be based on the collocated samples in the intra prediction.
  a. In one example, the residue between original samples and intra predictions may be signalled for escape pixels.
  b. In one example, the quantized residue between original samples and intra predictions may be signalled.
  c. In one example, the sign of the quantized residue between original samples and intra predictions may be signalled.
4. The palette mode and/or IBC mode may be performed at sub block level for one block
  a. In one example, whether to enable palette/IBC mode may be decided in the sub-block level, e.g., 4×4 luma block and/or 2×2 chroma blocks.
  b. In one example, the usage of chroma IBC may be firstly decided at sub block level. Then the palette mode may be applied to sub-blocks with chroma IBC disabled.
    i. In one example, if the current chroma sub block is not coded in IBC mode, it may be coded in palette mode.
      1) In one example, if the collocated luma block of the current chroma sub-block is not coded in IBC mode, the current chroma sub block may be coded in palette mode.
      2) In one example, if the IBC prediction block of the current chroma sub-block is not reconstructed yet, the current chroma sub block may be coded in palette mode.
    ii. In one example, on the current sub-block, the chroma IBC may be enabled or disabled based on the prediction mode of its collocated luma block. Alternatively, furthermore, if collocated luma block of the current chroma sub-block is coded in IBC mode, that chroma sub block may be coded in IBC mode as well.
    iii. In one example, the sub blocks with IBC enabled may be reconstructed by copying the collocated sample in IBC prediction and the sub blocks with IBC disabled may be reconstructed by palette colors.
  c. In one example, the indication of usage of the palette mode and/or IBC mode may be signalled at sub-blocks level.
    i. In one example, one flag may be signalled for each sub-block to indicate whether the current sub-block is coded in chroma IBC mode or palette mode.
  d. In one example, one flag may be firstly signalled at block level and the sub-block level decision to choose either IBC or palette mode for one color component may be decided according to the information from another color component.
  e. In one example, the sub-blocks may be square or rectangle blocks.

i. In one example, the sub-block size in the above methods may depend on
1) block dimension of current block
2) Current quantization parameter of current block
3) The palette flag of neighboring blocks
4) The intra block copy flags of neighboring blocks
5) Indication of the color format (such as 4:2:0, 4:4:4)
6) Separate/dual coding tree structure
7) Slice/tile group type and/or picture type
f. In one example, in the above method, the samples may be coded in both palette mode and IBC mode, therefore INDEX mode and/or COPY_ABOVE mode may have some limitations.
i. In one example, the INDEX mode and/or COPY_ABOVE mode may not be allowed to copy an index of sample coded in IBC mode.
ii. In one example, a sample coded in IBC mode may be inferred to have a special index.
1) In one example, the special index may be inferred to equal to any other palette indexes when performing INDEX mode and/or COPY_ABOVE mode.
2) In one example, if a sample has a special index, it may be reconstructed by a collocated IBC prediction.
iii. In one example, a sample coded in IBC mode may be skipped during performing INDEX mode and/or COPY_ABOVE mode.
g. The above methods may be applicable to the combined mode of palette and intra prediction mode wherein some samples may be predicted from the intra prediction mode and others may be predicted from palette mode.
5. A conformance bitstream shall obey the rule that when the PICP mode is selected, at least one valid BV candidate is existing in the IBC AMVP/Merge mode.
6. Whether or how to apply the above methods may be signaled in a video data unit level, such as SPS/VPS/PPS/APS/sequence header/picture header/slice header/tile group header/tile/LCU row.
a. In one example, furthermore, the signalling of the proposed method may be conditionally signaled, such as under the condition of IBC and palette modes are both enabled.
7. Indication of the usage of the above methods may be signaled in block level.
a. Alternatively, furthermore, it may be based on the following conditions.
i. In one example, the conditions are
1) block dimension of current block
a) In one example, if the width of the current block is larger than K1 (e.g., K1=64) or the height of the current block is larger than K2 (e.g., K2=64), signaling of the indication may be skipped.
2) prediction mode of current block
3) Current quantization parameter of current block
4) The palette flag of neighboring blocks
5) The intra block copy flags of neighboring blocks
6) Indication of the color format (such as 4:2:0, 4:4:4)
7) Separate/dual coding tree structure
8) Slice/tile group type and/or picture type b. Alternatively, furthermore, it may be based on the usage of the palette mode.
i. In one example, the flag indicates the above methods may be signaled when the flag of palette mode is true. Alternatively, furthermore, if the flag of palette mode is true, the flag indicates the above method may be signaled.
ii. In one example, the flag indicates the above methods may be inferred to true when the flag of palette mode is true. Alternatively, furthermore, if the flag of palette mode is true, the above method may be inferred to true.
iii. In one example, the flag indicates the above methods may be inferred to false when the flag of palette mode is false. Alternatively, furthermore, if the flag of palette mode is false, the above method may be inferred to false.
c. Alternatively, furthermore, it may be based on the usage of the PCIP.
i. In one example, the flag indicates the above methods may be signaled when the flag of PCIP is false. Alternatively, furthermore, if the flag of PCIP is false, the flag indicates the above method may be signaled.
ii. In one example, the flag indicates the above methods may be inferred to true when the flag of PCIP is false. Alternatively, furthermore, if the flag of palette mode is false, the above method may be inferred to true.
iii. In one example, the flag indicates the above methods may be inferred to false when the flag of PCIP is false. Alternatively, furthermore, if the flag of PCIP is false, the above method may be inferred to false.
iv. In one example, the flag indicates the above methods may be signaled before or after the flags of palette mode and/or PCIP.
d. Alternatively, furthermore, it may be based on the usage of the palette mode and the prediction mode.
i. In one example, the flag indicates the above methods may be inferred to true when the flag of palette mode is true and the prediction mode is MODE_IBC. Alternatively, furthermore, if the flag of palette mode is true and the prediction mode is MODE_IBC, the flag indicates the above method may be inferred to true.
ii. In one example, the flag indicates the above methods may be inferred to true when the flag of palette mode is true and the prediction mode is MODE_INTER. Alternatively, furthermore, if the flag of palette mode is true and the prediction mode is MODE_INTER, the flag indicates the above method may be inferred to true.
iii. In one example, the flag indicates the above methods may be inferred to false when the flag of palette mode is true and the prediction mode is MODE_INTRA. Alternatively, furthermore, if the flag of palette mode is true and the prediction mode is MODE_INTRA, the flag indicates the above method may be inferred to false.
e. In one example, indication of the palette mode may be firstly signaled, followed by indications of whether PCIP or above methods is applied to one block.
i. Alternatively, furthermore, when the palette mode is utilized, three choices may be allowed, conventional palette mode, PCIP or above method.

1) In one example, a first flag may be coded to indicate whether it is coded with PCIP. A second flag may be coded to indicate whether it is coded with above method. When neither PCIP nor above methods are applied, the conventional palette mode is enabled.
2) In one example, signalling of the second flag is skipped when PCIP is enabled. That is, when the second flag needs to be coded, it is coded after the first flag.
3) Alternatively, signalling of the first flag is skipped when above method is enabled. That is, when the first flag needs to be coded, it is coded after the second flag.
4) Alternatively, different orders of signalling of indications of the three choices may be utilized.

ii. Alternatively, the conventional palette mode may be disabled without being signaled. Instead, one block may choose either to be coded with PCIP or above methods.
   1) Alternatively, furthermore, whether/how to use PCIP or above methods may be signaled when current prediction mode is intra mode.

f. In one example, the indication of the any one or multiple of the above methods may be signaled using bypass-coded bins or context-coded bins in arithmetic coding.
   i. In one example, the context may be derived based on the indications of any one or multiple of the above methods of blocks neighboring to the current block.
      1) In one example, only one context may be used on the signaling of the indication of the above method.
      2) In one example, the context may be derived based on coded information of neighboring blocks.
         a) In one example, the context may be derived based on the indications of any one or multiple of the above methods of neighboring blocks left to and/or above to the current block (as shown in FIG. 9).
         b) For example, let cu_left_ibc_palette_mode and cu_above_ibc_palette_mode be the indications of above method of the left neighboring block and the above neighboring block of the current block (e.g., the neighboring blocks as shown in the FIG. 9). In one example, the current contexts may be derived by the following equation $ctxInc=(cu\_left\_ibc\_palette\_mode?1:0)+ (cu\_above\_ibc\_palette\_mode?1:0)$ c) Alternatively, in one example, the current contexts may be derived by the following equation $ctxInc=(cu\_left\_ibc\_palette\_mode?1:0)*2+ (cu\_above\_ibc\_palette\_mode?1:0)$ 3) In one example, the context may be derived based on the availability of blocks neighboring to the current block.
         a) In one example, the indication of any one or multiple of the above methods of a neighbouring block may be set to be a default value (such as 0) if the neighbouring block is unavailable.
         b) In one example, a neighbouring block may be treated as unavailable if it is in a different CTU row to the current block.
      4) In one example, the context may be derived based on the coded information of current block, such as block dimension/partition splitting depth (e.g., quad-tree/binary tree/ternary tree).

g. In one example, the signaling of any one or multiple of the above methods may also be applied on conventional palette mode or PICP mode.

5. Embodiment Added to JVET-M1001-v5

1.1.1.1 Sequence Parameter Set RBSP Syntax

In this document, underlined italicized bolded font, or italicized bolded font, indicates text added to relevant parts of the JVET-M1001-v5 specification.

| seq_parameter_set_rbsp( ) { | Descriptor |
|---|---|
| sps_max_sub_layers_minus1 | u(3) |
| ... | |
| sps_ibc_enabled_flag | u(1) |
| *sps_palette_enabled_flag* | u(1) |
| ... | u(1) |
| } | |

```
coding_unit( x0, y0, cbWidth,
cbHeight, treeType ) {                           Descriptor
  if( slice_type != I ) {
    cu_skip_flag[ x0 ][ y0 ]                     ae(v)
    if( cu_skip_flag[ x0 ][ y0 ] = = 0 )
      pred_mode_flag                             ae(v)
  }
  if( CuPredMode[ x0 ][ y0 ] = =
MODE_INTRA ) {
    if( pcm_enabled_flag &&
      cbWidth >= MinIpcmCbSizeY &&
      cbWidth <= MaxIpcmCbSizeY
&&
      cbHeight >= MinIpcmCbSizeY
      && cbHeight <=
MaxIpcmCbSizeY )
      pcm_flag[ x0 ][ y0 ]                       ae(v)
    if( pcm_flag[ x0 ][ y0 ] ) {
      while( !byte_aligned( ) )
        pcm_alignment_zero_bit                   f(1)
      pcm_sample( cbWidth,
      cbHeight, treeType )
    } else {
      if(cbWidth > 64 || cbHeight >64
|| !sps_palette_enabled_flag)
      {
        cu_palette_flag[x0][y0] = 0
      }else{
        cu_palette_flag[x0][y0]                  ae(v)
      }
      if(cu_palette_flag[x0][y0]{
        if(treeType = = SINGLE_TREE){
          palette_coding(x0, y0, , nWidth, nHeight, 0, 3)
        }else{
          if(treeType = = DUAL_TREE_LUMA)
            palette_coding(x0, y0, , nWidth, nHeight, 0, 1)
          if(treeType = = DUAL_TREE_CHROMA)
            palette_coding(x0, y0, , nWidth/SubWidthC,
nHeight/SubHeightC, 1, 2)
        }
      }
    } else {
      if( treeType = =
```

-continued

| coding_unit( x0, y0, cbWidth, cbHeight, treeType ) { | Descriptor |
|---|---|
| SINGLE_TREE \|\| treeType = = DUAL_TREE_LUMA ) { | |
|   if( ( y0 % CtbSizeY ) > 0 ) | |
|   intra_luma_ref_idx[ x0 ][ y0 ] | ae(v) |
|   if (intra_luma_ref_idx | |
|   [ x0 ][ y0 ] = = 0 && | |
|   ( cbWidth <= MaxTbSizeY \|\| | |
|   cbHeight <= MaxTbSizeY ) && | |
|   ( cbWidth * cbHeight > | |
|   MinTbSizeY * MinTbSizeY )) | |
|   intra_subpartitions_mode_ | ae(v) |
|   flag[ x0 ][ y0 ] | |
|   if( intra_subpartitions_mode_ | |
|   flag[ x0 ][ y0 ] = = 1 && | |
|   cbWidth <= MaxTbSizeY && | |
|   cbHeight <= MaxTbSizeY ) | |
|   intra_subpartitions_split_ | ae(v) |
|   flag[ x0 ][ y0 ] | |
|   if( intra_luma_ref_idx | |
|   [ x0 ][ y0 ] = = 0 && | |
|   intra_subpartitions_mode_ | |
|   flag[ x0 ][ y0 ] = = 0 ) | |
|   intra_luma_mpm_flag[ x0 ][ y0 ] | ae(v) |
|   if( intra_luma_mpm_ | |
|   flag[ x0 ][ y0 ] ) | |
|   intra_luma_mpm_idx[ x0 ][ y0 ] | ae(v) |
|   else | |
|   intra_luma_mpm_ | ae(v) |
|   remainder[ x0 ][ y0 ] | |
|   } | |
| ... | |
| } | |

| coding_unit( x0, y0, cbWidth, cbHeight, treeType ) { | Descriptor |
|---|---|
|  if( slice_type != I ) { | |
|   cu_skip_flag[ x0 ][ y0 ] | ae(v) |
|   if( cu_skip_flag[ x0 ][ y0 ] = = 0 ) | |
|   pred_mode_flag | ae(v) |
|  } | |
|  if( CuPredMode[ x0 ][ y0 ] = = MODE_INTRA ) { | |
|   if( pcm_enabled_flag && | |
|   cbWidth >= MinIpcmCbSizeY && | |
|   cbWidth <= MaxIpcmCbSizeY | |
|   && | |
|   cbHeight >= MinIpcmCbSizeY | |
|   && cbHeight <= MaxIpcmCbSizeY ) | |
|   pcm_flag[ x0 ][ y0 ] | ae(v) |
|   if( pcm_flag[ x0 ][ y0 ] ) { | |
|   while( !byte_aligned( ) ) | |
|   pcm_alignment_zero_bit | f(1) |
|   pcm_sample( cbWidth, cbHeight, treeType ) | |
|   } else { | |
|   <u>If(cbWidth > 64 \|\| cbHeight > 64</u> | |
| <u>\|\| !sps_palette_enabled_flag)</u> | |
| <u>{</u> | |
|   <u>cu_palette_flag[x0][y0] = 0</u> | |
|   <u>}else{</u> | |
|   <u>cu_palette_flag[x0][y0]</u> | ae(v) |
|   <u>}</u> | |
|   <u>if(cu_palette_flag[x0][y0]){</u> | |
|   <u>cu_palette_ibc_flag[x0][y0]</u> | ae(v) |
|   <u>if(treeType = = SINGLE_TREE){</u> | |
|   <u>palette_coding(x0, y0, , nWidth, nHeight, 0, 3)</u> | |
|   <u>}else{</u> | |
|   <u>if(treeType = = DUAL_TREE_LUMA)</u> | |
|   <u>palette_coding(x0, y0, , nWidth, nHeight, 0, 1)</u> | |
|   <u>if(treeType = = DUAL_TREE_CHROMA)</u> | |
|   <u>palette_coding(x0,y0, , nWidth/SubWidthC,</u> | |

-continued

| coding_unit( x0, y0, cbWidth, cbHeight, treeType ) { | Descriptor |
|---|---|
| <u>nHeight/SubHeightC, 1, 2)</u> | |
|   <u>}</u> | |
|  } else { | |
|   if( treeType = = SINGLE_TREE \|\| treeType = = DUAL_TREE_LUMA ) { | |
|   if( ( y0 % CtbSizeY ) > 0 ) | |
|   intra_luma_ref_idx[ x0 ][ y0 ] | ae(v) |
|   if (intra_luma_ref_idx | |
|   [ x0 ][ y0 ] = = 0 && | |
|   ( cbWidth <= MaxTbSizeY \|\| | |
|   cbHeight <= MaxTbSizeY ) && | |
|   ( cbWidth * cbHeight > | |
|   MinTbSizeY * MinTbSizeY )) | |
|   intra_subpartitions_mode_ | ae(v) |
|   flag[ x0 ][ y0 ] | |
|   if( intra_subpartitions_mode_ | |
|   flag[ x0 ][ y0 ] = = 1 && | |
|   cbWidth <= MaxTbSizeY && | |
|   cbHeight <= MaxTbSizeY ) | |
|   intra_subpartitions_split_ | ae(v) |
|   flag[ x0 ][ y0 ] | |
|   if( intra_luma_ref_idx | |
|   [ x0 ][ y0 ] = = 0 && | |
|   intra_subpartitions_mode_ | |
|   flag[ x0 ][ y0 ] = = 0 ) | |
|   intra_luma_mpm_flag | ae(v) |
|   [ x0 ][ y0 ] | |
|   if( intra_luma_mpm_ | |
|   flag[ x0 ][ y0 ] ) | |
|   intra_luma_mpm_ | ae(v) |
|   idx[ x0 ][ y0 ] | |
|   else | |
|   intra_luma_mpm_ | ae(v) |
|   remainder[ x0 ][ y0 ] | |
|   } | |
| ... | |
| } | |

| coding_unit( x0, y0, cbWidth, cbHeight, treeType ) { | Descriptor |
|---|---|
|  if( slice_type != I ) { | |
|   cu_skip_flag[ x0 ][ y0 ] | ae(v) |
|   if( cu_skip_flag[ x0 ][ y0 ] = = 0 ) | |
|   pred_mode_flag | ae(v) |
|  } | |
|  if( CuPredMode[ x0 ][ y0 ] = = MODE_INTRA ) { | |
|   <u>If(cbWidth > 64 \|\| cbHeight > 64 \|\|</u> | |
| <u>!sps_palette_enabled_flag)</u> | |
| <u>{</u> | |
|   <u>cu_palette_flag[x0][y0] = 0</u> | |
|   <u>}else{</u> | |
|   <u>cu_palette_flag[x0][y0]</u> | ae(v) |
|   <u>}</u> | |
|   <u>if(cu_palette_flag[x0][y0]){</u> | |
|   <u>cu_palette_ibc_flag[x0][y0]</u> | ae(v) |
|   <u>if(treeType = = SINGLE_TREE){</u> | |
|   <u>palette_coding(x0, y0, , nWidth, nHeight, 0, 3)</u> | |
|   <u>}else{</u> | |
|   <u>if(treeType = = DUAL_TREE_LUMA)</u> | |
|   <u>palette_coding(x0, y0, , nWidth, nHeight, 0, 1)</u> | |
|   <u>if(treeType = = DUAL_TREE_CHROMA)</u> | |
|   <u>palette_coding(x0,y0, , nWidth/SubWidthC,</u> | |
| <u>nHeight/SubHeightC, 1, 2)</u> | |
|   <u>}</u> | |
|  } else { | |
|   <u>if( pcm_enabled_flag &&</u> | |
|   <u>cbWidth >= MinIpcmCbSizeY && cbWidth <=</u> | |

| coding_unit( x0, y0, cbWidth, cbHeight, treeType ) { | Descriptor |
|---|---|
| *MaxIpcmCbSizeY &&* | |
|    *cbHeight >= MinIpcmCbSizeY && cbHeight <= MaxIpcmCbSizeY)* | |
|    *pcm_flag[x0][y0]* | *ae(v)* |
|    *if(pcm_flag[x0][y0]){* | |
|      *while(!byte_aligned( ))* | |
|        *pcm_alignment_zero_bit* | *f(1)* |
|      *pcm_sample(cbWidth, cbHeight, treeType)* | |
|   } else { | |
|    if( treeType = = SINGLE_TREE \|\| treeType = = DUAL_TREE_LUMA ) { | |
|     if( ( y0 % CtbSizeY ) > 0 ) | |
|      intra_luma_ref_idx[ x0 ][ y0 ] | ae(v) |
|     if (intra_luma_ref_idx[ x0 ][ y0 ] = = 0 && | |
|      ( cbWidth <= MaxTbSizeY \|\| cbHeight <= MaxTbSizeY ) && | |
|      ( cbWidth * cbHeight > MinTbSizeY * MinTbSizeY )) | |
|     intra_subpartitions_mode_flag[ x0 ][ y0 ] | ae(v) |
|     if( intra_subpartitions_mode_flag[ x0 ][ y0 ] = = 1 && cbWidth <= MaxTbSizeY && cbHeight <= MaxTbSizeY ) | |
|      intra_subpartitions_split_flag[ x0 ][ y0 ] | ae(v) |
|     if( intra_luma_ref_idx[ x0 ][ y0 ] = = 0 && intra_subpartitions_mode_flag[ x0 ][ y0 ] = = 0 ) | |
|      intra_luma_mpm_flag[ x0 ][ y0 ] | ae(v) |
|     if( intra_luma_mpm_flag[ x0 ][ y0 ] ) | |
|      intra_luma_mpm_idx[ x0 ][ y0 ] | ae(v) |
|     else | |
|      intra_luma_mpm_remainder[ x0 ][ y0 ] | ae(v) |
|    } | |
| ... | |
| } | |

| coding_unit( x0, y0, cbWidth, cbHeight, treeType ) { | Descriptor |
|---|---|
| if( slice_type != I ) { | |
|   cu_skip_flag[ x0 ][ y0 ] | ae(v) |
|   if( cu_skip_flag[ x0 ][ y0 ] = = 0 ) | |
|     pred_mode_flag | ae(v) |
| } | |
| if( CuPredMode[ x0 ][ y0 ] = = MODE_INTRA ) { | |
|   *If(cbWidth > 64 \|\| cbHeight > 64 \|\|!sps_palette_enabled_flag)* | |
| *{* | |
|   *cu_palette_flag[x0][y0] = 0* | |
|   *}else{* | |
|   *cu_palette_flag[x0][y0]* | ae(v) |
|   *}* | |
|   *if(cu_palette_flag[x0][y0]){* | |
|     *if(treeType == SINGLE_TREE) {* | |
|     *palette_coding(x0, y0, ,nWidth, nHeight, 0, 3)* | |
|     *}else{* | |
|     *if(treeType = =DUAL_TREE_LUMA)* | |
|     *palette_coding(x0, y0, ,nWidth, nHeight, 0, 1)* | |
|     *if(treeType = =DUAL_TREE_CHROMA)* | |
|     *palette_coding(x0, y0, ,nWidth/SbWidthC, nHeight/SubHeightC, 1, 2)* | |
|     *}* | |
|   *}else{* | |
|   *if(pcm_enabled_flag &&* | |
|     *cbWidth >= MinIpcmCbSizeY && cbWidth <= MaxIpcmCbSizeY &&* | |
|     *cbHeight >= MinIpcmCbSizeY && cbHeight <= MaxIpcmCbSizeY)* | |
|     *pcm_flag[x0][y0]* | *ae(v)* |
|     *if(pcm_flag[x0][y0]){* | |
|       *while(!byte_aligned( ))* | |
|         *pcm_alignment_zero_bit* | *f(1)* |
|       *pcm_sample(cbWidth,cbHeight, treeType* | |
|   } else { | |
|    if( treeType = = SINGLE_TREE \|\| treeType = = DUAL_TREE_LUMA ) { | |
|     if( ( y0 % CtbSizeY ) > 0 ) | |
|      intra_luma_ref_idx[ x0 ][ y0 ] | ae(v) |
|     if (intra_luma_ref_idx[ x0 ][ y0 ] = = 0 && | |
|      ( cbWidth <= MaxTbSizeY \|\| cbHeight <= MaxTbSizeY ) && | |
|      ( cbWidth * cbHeight > MinTbSizeY * MinTbSizeY )) | |
|     intra_subpartitions_mode_flag[ x0 ][ y0 ] | ae(v) |
|     if( intra_subpartitions_mode_flag[ x0 ][ y0 ] = = 1 && cbWidth <= MaxTbSizeY && cbHeight <= MaxTbSizeY ) | |
|      intra_subpartitions_split_flag[ x0 ][ y0 ] | ae(v) |
|     if( intra_luma_ref_idx[ x0 ][ y0 ] = = 0 && | |

-continued

| coding_unit( x0, y0, cbWidth, cbHeight, treeType ) { | Descriptor |
|---|---|
|         intra_subpartitions_mode_flag[ x0 ][ y0 ] = = 0 ) | |
|         intra_luma_ mpm_flag[ x0 ][ y0 ] | ae(v) |
|       if( intra_luma mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
| ... | |
| } | |

| coding_unit( x0, y0, cbWidth, cbHeight, treeType ) { | Descriptor |
|---|---|
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( pcm_enabled_flag && | |
|       cbWidth >= MinIpcmCBSizeY && cbWidth <= MaxIpcmCbSizeY && | |
|       cbHeight >= MinIpcmCBSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       If(cbWidth > 64 \|\| cbHeight > 64 \|\| !sps_palette_enabled_flag) { | |
|         cu_palette_flag[ x0 ][ y0 ] = 0 | |
|       } else { | |
|         cu_palette_flag[ x0 ][ y0 ] | ae(v) |
|       } | |
|       if(cu_palette_flag[ x0 ][ y0 ])· { | |
|         if( (tree Type = = DUAL_TREE_LUMA \|\| treeType = = | |
|           DUAL_TREE_CHROMA) && cbWidth * cbHeight >= 256 ) { | |
|           cu_intrapalette_flag[ x0 ][ y0 ] | |
|         } else { | |
|           cu_intrapalette_flag[ x0 ][ y0 ] = 0 | |
|         } | |
|         if(cu_intrapalette_flag [ x0 ][ y0 ]){ | |
|           cu_intrapalette_mode[ x0 ][ y0 ] | |
|         } | |
|           else{ | |
|             cu_palette_ibc_flag[ x0 ][ y0 ] | |
|           } | |
|         if(treeType = = SINGLE_TREE) { | |
|           palette_coding( x0, y0, , nWidth, nHeight, 0, 3) | |
|         } else { | |
|       if(treeType = = DUAL_TREE_LUMA ) | |
|         palette_coding( x0, y0, , nWidth, nHeight, 0, 1 ) | |
|       if(treeType = = DUAL_TREE_CHROMA) | |
|         palette_coding( x0, y0, , nWidth/SubWidthC, nHeight/SubHeightC , 1, 2 ) | |
|       } | |
|         } else { | |
|     if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
| ... | |
| } | |

| coding_unit( x0, y0, cbWidth, cbHeight, treeType ) { | Descriptor |
|---|---|
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       If(cbWidth >64 \|\| cbHeight > 64 \|\| !sps_palette_enabled_flag) { | |
|         cu_palette_flag[ x0 ][ y0 ] = 0 | |
|       } else { | |
|         cu_palette_flag[ x0 ][ y0 ] | ae(v) |
|       } | |
|       if(cu_palette_flag[ x0 ][ y0 ])· { | |
|         cu_palette_ibc_flag[ x0 ][ y0 ] | |
|         if( (treeType = = DUAL_TREE_LUMA \|\| treeType = = DUAL_TREE_CHROMA) && cbWidth * cbHeight >= 256 && cu_palette_ibc_flag[ x0 ][ y0 ] = = 0 ) { | |
|           cu_intrapalette_flag[ x0 ][ y0 ] | |
|         } else { | |
|           cu_intrapalette_flag[ x0 ][ y0 ] = 0 | |
|         } | |
|         if(cu_intrapalette_flag [ x0 ][ y0 ]){ | |
|           cu_intrapalette_mode[ x0 ][ y0 ] | |
|         } | |
|       if(treeType = = SINGLE_TREE) { | |
|         palette_coding( x0, y0, , nWidth, nHeight, 0, 3) | |
|       } else { | |
|     if(treeType = = DUAL_TREE_LUMA ) | |
|       palette_coding( x0, y0, , nWidth, nHeight, 0, 1 ) | |
|       if(treeType = = DUAL_TREE_CHROMA) | |
|         palette_coding( x0, y0, , nWidth/SubWidthC, nHeight/SubHeightC , 1, 2 ) | |
|     } | |
|       } else { | |
|       if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
| ... | |
| } | | cu_intrapalette_flag specifies the use of intra-palette combine mode in the current coding unit. cu_intrapalette_flag==1 indicates that intra-palette combine mode is applied in the current coding unit. cu_intrapalette_flag==0 indicates that intra-palette combine mode is not applied for the current coding unit.

treeType specifies whether joint tree is applied in the current coding tree. treeType==SINGLE_TREE indicates that the same coding unit partition is applied for both luma and chorma. treeType !=SINGLE_TREE indicates that separate coding unit partitions are applied for luma and chroma (dual tree). treeType==DUAL_TREE_LUMA indicates that the current partition is for luma component in dual tree and treeType==DUAL_TREE_CHROMA indicates that the current partition is for luma component in dual tree.

startComp specifies the first colour component of the current palette table. startComp==0 indicates the Y component and startComp==1 and 2 indicates Cb and Cr components.

numComps specifies the number of colour components in the current palette table.

The predictor palette consists of palette entries from previous coding units that are used to predict the entries in the current palette.

The variable PredictorPaletteSize [startComp] specifies the size of the predictor palette for the first colour component of the current palette table startComp.

The variable PalettePredictorEntryReuseFlags[i] equal to 1 specifies that the i-th entry in the predictor palette is reused in the current palette.

PalettePredictorEntryReuseFlags[i] equal to 0 specifies that the i-th entry in the predictor palette is not an entry in the current palette. All elements of the array PalettePredictorEntryReuseFlags[i] are initialized to 0.

| | |
|---|---|
| *palette_coding[x0, y0, , nWidth,nHeight, startComp, numComps) {* | *Descriptor* |
| *palettePredictionFinished = 0* | |
| *NumPredictedPaletteEntries = 0* | |
| *for(predictorEntryIdx = 0; predictorEntryIdx < PredictorPaletteSize[startComp] && !palettePredictionFinished && NumPredictedPaletteEntries [startComp] < palette_max_size; predictorEntryIdx++){* | |
| *palette_predictor_run* | *ae(v)* |
| *if( palette_predictor_run != 1){* | |
| *if( palette_predictor_run > 1)* | |
| *predictorEntryIdx += palette_predictor_run – 1* | |
| *PalettePredictorEntryReuseFlags[startComp][predictorEntryIdx] = 1* | |
| *NumPredictedPaletteEntries[startComp]++* | |
| *}else* | |
| *palettePredictionFinished = 1* | |
| *}* | |
| *if(NumPredictedPaletteEntries[startComp] < palette_max_size )* | |
| *num_signalled_palette entries[startComp]* | *ae(v)* |
| *for(cIdx = startComp; cIdx<(startComp + numComps); cIdx++ )* | |
| *for(i = 0; i < num_signalled_palette_entries[startComp]; i++)* | |
| *new_palette_entries[startComp][i]* | *ae(v)* |
| *if(CurrentPaletteSize != 0)* | |
| *palette_escape_val_present_flag[startComp]* | *ae(v)* |
| *if(MaxPaletteIndex > 1) {* | |
| *num_palette_indices_minus1* | *ae(v)* |
| *adjust = 0* | |
| *for(i = 0; i <= num_palette indices_minus1 'i++){* | |
| *if(MaxPaletteIndex - adjust > 1){* | |
| *palette_index_idc* | *ae(v)* |
| *PaletteIndexIdc [i] = palette_index_idc* | |
| *}* | |
| *adjust = 1* | |
| *}* | |
| *copy_above_indices_for_final_run_flag* | *ae(v)* |
| *palette_transpose_flag[startComp]* | *ae(v)* |
| *}* | |
| *remainingNumIndices =num_palette_indices_minus1 + 1* | |
| *PaletteScanPos = 0* | |
| *while(PaletteScanPos<nWidth*nHeightt) {* | |
| *xC = x0 + ScanOrder[nWidth][nHeight][3][PaletteScanPos][0]* | |
| *yC = y0 + ScanOrder[nWidth][nHeight][3][PaletteScanPos][1]* | |
| *if(PaletteScanPos > 0){* | |
| *xcPrev = x0 + ScanOrder[nWidth][nHeight][3][PaletteScanPos – 1][0]* | |
| *ycPrev = y0 + ScanOrder[nWidth][nHeight][3][PaletteScanPos –1][1]* | |
| *}* | |
| *PaletteRun = nWidth * nHeight – PaletteScanPos –1* | |
| *CopyAboveIndicesFlag[xC][yC] = 0* | |
| *if(MaxPaletteIndex > 1)* | |
| *if( ((!palette_transpose_flag && PaletteScanPos>=nWidth) ||( (palette_transpose_flag && PaletteScanPos>=nHeight)) && CopyAboveIndicesFlag[xcPrev][ycPrev] = = 0)* | |
| *if(remainingNumIndices >0 && PaletteScanPos < nWidth* nHeight – 1){* | |
| *copy_above_palette_indices_flag* | *ae(v)* |
| *CopyAboveIndicesFlag[xC][yC] = copy_above_palette_indices_flag* | |
| *}else* | |
| *if(PaletteScanPos = =nWidth * nHeight – 1 && remainingNumIndices > 0)* | |

| *palette_coding(x0, y0, , nWidth,nHeight, startComp, numComps) {* | *Descriptor* |
|---|---|
| *CopyAboveIndicesFlag[xC][yC] = 0* | |
| *Else* | |
| *CopyAboveIndicesFlag[xC][yC] = 1* | |
| *if(CopyAboveIndicesFlag [xC][yC] = = 0) {* | |
| *currNumIndicies = num palette_indices_minus1 + 1 – remainingNumIndicies* | |
| *CurrPaletteIndex =PaletteIndexIdc[currNumIndicies]* | |
| *}* | |
| *if(MaxPaletteIndex > 1){* | |
| *if(CopyAboveIndicesFlag[xC][yC] = = 0)* | |
| *remainingNumIndices – = 1* | |
| *PaletteMaxRun = nCbS * nCbS – PaletteScanPos – 1 – remainingNumIndices –* | |
| *copy_above_indices_for_final_run_flag* | |
| *if(remainingNumIndices > 0 || CopyAboveIndicesFlag[xC][yC] !=* | |
| *copy_above_indices_ for_final_run_flag)* | |
| *if(PaletteMaxRun > 0){* | |
| *palette_run_prefix* | *ae(v)* |
| *if( (palette_run_prefix > 1) && (PaletteMaxRun != (1 << (palette_run_prefix – 1))))* | |
| *palette_run_suffix* | *ae(v)* |
| *}* | |
| *}* | |
| *runPos = 0* | |
| *while(runPos <= PaletteRun){* | |
| *xR = x0 + ScanOrder[nWidth][nHeight][3][PaletteScanPos][0]* | |
| *yR = y0 + ScanOrder[nWidth][nHeight][3][PaletteScanPos][1]* | |
| *if( CopyAboveIndicesFlag[xC][yC] = = 0){* | |
| *CopyAboveIndicesFlag[xR][yR] = 0* | |
| *PaletteIndexMap[startComp][xR][yR] = CurrPaletteIndex* | |
| *}else{* | |
| *CopyAboveIndicesFlag[xR][yR] = 1* | |
| *if (!palette_transpose_flag)* | |
| *PaletteIndexMap[startComp][xR][yR] = PaletteIndexMap[ startComp][xR][yR – 1]* | |
| *else* | |
| *PaletteIndexMap[ startComp][xR][yR] = PaletteIndexMap[ startComp][xR – 1][yR]* | |
| *}* | |
| *runPos++* | |
| *PaletteScanPos++* | |
| *}* | |
| *}* | |
| *if( palette_escape_val_present_flag ) {* | |
| *for(cIdx = startComp; cIdx < (startComp + numComps); cIdx++ )* | |
| *for(sPos = 0; sPos < nWidth*nHeight; sPos++){* | |
| *xC = x0 + ScanOrder[ nWidth][nHeight][3][sPos][0]* | |
| *yC = y0 + ScanOrder[n Width][nHeight][3][sPos][1]* | |
| *if(PaletteIndexMap[startComp][xC][yC] = = (MaxPaletteIndex – 1)){* | |
| *if(cIdx = = 0 || startComp !=0){* | |
| *palette_escape_sign* | *u(1)* |
| *palette_escape_val* | *ue3(v)* |
| *PaletteEscapeVal[cIdx][xC][yC] = palette_escape_sign > 0 ? palette_escape_val : -palette_escape_val* | |
| *}* | |
| *if(startComp == 0 && cIdx !=0 && xC% 2 == 0 && yC %2 == 0){* | |
| *palette_escape_sign* | *u(1)* |
| *palette_escape_val* | *ue3 (v)* |

| palette_coding(x0, y0, , nWidth,nHeight, startComp, numComps) { | Descriptor |
|---|---|
|     PaletteEscapeVal[cIdx][xC][ yC] = palette_escape_sign > 0 ? palette_escape_val : -palette_escape_val | |
|    } | |
|   } | |
|  } | |
|  } | |
| } | |

1.1.1.2 Palette Semantics

In the following semantics, the array indices x0, v0 specify the location (x0, v0) of the top-left luma sample of the considered coding block relative to the top-left luma sample of the picture.

cu palette flag specifies the use of palette mode in the current coding unit. cu palette flag==1 indicates that palette mode is applied in the current coding unit. cu palette flag==0 indicates that palette mode is not applied for the current coding unit.

cu_palette_ibc_flag specifies the use of palette mode in the current coding unit. cu_palette_ibc_flag==1 indicates that the mode of palette combined IBC prediction is applied in the current coding unit. cu_palette_ibc_flag==0 indicates that the mode of palette combined IBC prediction is not applied for the current coding unit.

palette_predictor_run is used to determine the number of zeros that precede a non-zero entry in the array PalettePredictorEntryReuseFlags.

It is a requirement of bitstream conformance that the value of palette predictor run shall be in the range of 0 to (PredictorPaletteSize−predictorEntryIdx), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to palette max size, inclusive.

num_signalled_palette_entries [startComp] specifies the number of entries in the current palette that are explicitly signalled for the first colour component of the current palette table startComp.

When num_signalled_palette_entries [startComp] is not present, it is inferred to be equal to 0.

The variable CurrentPaletteSize specifies the size of the current palette and is derived as follows:

CurrentPaletteSize[startComp]=NumPredictedPaletteEntries[startComp]+num_signalled_palette_entries[startComp]   (XX)

The value of CurrentPaletteSize [startComp] shall be in the range of 0 to palette_max_size, inclusive.

new_palette_entries[cIdx][i] specifies the value for the i-th signalled palette entry for the colour component cIdx.

The variable PredictorPaletteEntries[cIdx][1] specifies the i-th element in the predictor palette for the colour component cIdx.

The variable CurrentPaletteEntries[cIdx][1] specifies the i-th element in the current palette for the colour component cIdx and is derived as follows:

```
numPredictedPaletteEntries = 0                                    (XX)
for( i = 0; i <PredictorPaletteSize[ startComp]; i++)
    if( PalettePredictorEntrvReuseFlaas[ i 1 ]) {
        for( cidx =startComp; cidx < (startComp + numComps); cIdx++)
            CurrentPaletteEntries[ cIdx ][ numPredictedPaletteEntries ]=
                PredictorPaletteEntries[ cIdx ][ i ]
                numPredictedPaletteEntries++
    }
for( i = 0; i < num_signalled_palette_entries[startComp]; i++)
    for( cIdx =startComp; cIdx < (startComp + numComps); cIdx++)
        CurrentPaletteEntries[ cIdx ][ numPredictedPaletteEntries + i ]
        =
            new palette entries[ cIdxg ][ i ]
``` palette_escape_val_present_flag equal to 1 specifies that the current coding unit contains at least one escape coded sample. escape_val_present_flag equal to 0 specifies that there are no escape coded samples in the current coding unit. When not present, the value of palette escape_val_present_flag is inferred to be equal to 1.

The variable MaxPaletteIndex specifies the maximum possible value for a palette index for the current coding unit. The value of MaxPaletteIndex is set equal to CurrentPaletteSize+palette escape_val_present_flag.

num_palette_indices_minus1 plus 1 is the number of palette indices explicitly signalled or inferred for the current block. When num_palette_indices_minus1 is not present, it is inferred to be equal to 0.

palette_index_idc is an indication of an index to the array represented by CurrentPaletteEntries. The value of palette_index_idc shall be in the range of 0 to MaxPaletteIndex, inclusive, for the first index in the block and in the range of 0 to (MaxPaletteIndex−1), inclusive, for the remaining indices in the block.

When palette_index_idc is not present, it is inferred to be equal to 0.

The variable PaletteIndexIdc[i] stores the i-th palette index idc explicitly signalled or inferred. All elements of the array PaletteIndexIdc[i] are initialized to 0.

copy_above_indices_for_final_run_flag equal to 1 specifies that the palette indices of the last positions in the coding unit are copied from the palette indices in the row above if horizontal traverse scan is used or the palette indices in the left column if vertical traverse scan is used. copy above indices for final run flag equal to 0 specifies that the palette indices of the last positions in the coding unit are copied from PaletteIndexIdc[num palette indices minus1].

When copy_above_indices_for_final_run_flag is not present, it is inferred to be equal to 0.

palette_transpose_flag equal to 1 specifies that vertical traverse scan is applied for scanning the indices for pixels in the current coding unit. palette_transpose_flag equal to 0 specifies that horizontal traverse scan is applied for scanning the indices for pixels in the current coding unit.

copy_above_palette_indices_flag equal to 1 specifies that the palette index is equal to the palette index at the same location in the row above if horizontal traverse scan is used or the same location in the left column if vertical traverse scan is used. copy_above_palette_indices_flag equal to 0 specifies that an indication of the palette index of the sample is coded in the bitstream or inferred.

The variable CopyAboveIndicesFlag[xC][yC] equal to 1 specifies that the palette index is copied from the palette index in the row above (horizontal scan) or left column (vertical scan). CopyAboveIndicesFlag[xC][yC] equal to 0 specifies that the palette index is explicitly coded in the bitstream or inferred. The array indices xC, yC specify the location (xC, yC) of the sample relative to the top-left luma sample of the picture.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] shall be in the range of 0 to MaxPaletteIndex, inclusive. The variable PaletteRun specifies the number of consecutive locations minus 1 with the same palette index as the position in the above row (horizontal scan) or in the left column (vertical scan) when CopvAboveIndicesFlag[xC][yC] is equal to 1 or specifies the number of consecutive locations minus 1 with the same palette index when CopyAboveIndicesFlag[xC][yC] is equal to 0.

The variable PaletteMaxRun represents the maximum possible value for PaletteRun. It is a requirement of bitstream conformance that the value of PaletteMaxRun shall be greater than or equal to 0.

palette_run_prefix specifies the prefix part in the binarization of PaletteRun.

palette run suffix specifies the suffix part in the binarization of PaletteRun. When palette run suffix is not present, the value of palette run suffix is inferred to be equal to 0.

The value of PaletteRun is derived as follows:
If palette_run_prefix is less than 2, the following applies:

PaletteRun=palette run prefix (XX)

Otherwise (palette_run_prefix is greater than or equal to 2), the following applies:

PrefixOffset=1<<(palette_run_prefix−1)

PaletteRun=PrefixOffset+palette run suffix (XX)

palette_escape_val specifies the magnitude of the quantized escape coded sample value for a component.

palette_escape_sign specifies the sign of quantized escape coded sample value for a component.

The variable PaletteEscapeVal[cIdx][xC][yC] specifies the escape value of a sample for which PaletteIndexMap[xC][yC] is equal to (MaxPaletteIndex−1) and palette_escape_val_present_flag is equal to 1. The array index cIdx specifies the colour component. The array indices xC, yC specify the location (xC, yC) of the sample relative to the top-left luma sample of the picture.

It is a requirement of bitstream conformance that PaletteEscapeVal[cIdx][xC][yC] shall be in the range of $-((1<<(BitDepth_Y+1))-1)$ to $(1<<(BitDepth_Y+1))-1$, inclusive, for cIdx equal to 0, and in the range of 0 to $(1<<(BitDepth_C+1))-1$, inclusive, for cIdx not equal to 0

Decoding Process for Palette Mode
Inputs to this process are:
  a location (xCb, yCb) specifying the top-left luma sample of the current block relative to the top-left luma sample of the current picture,
  a variable startComp specifies the first colour component in the palette table,
  a variable cIdx specifying the colour component of the current block,
  two variables nTbW and nTbH specifying the width and height of the current block, respectively.
Output of this process is an array recSamples[x][y], with x=0 . . . nTbW−1, y=0 . . . nTbH−1 specifying reconstructed sample values for the block.
Depending on the value of cIdx, the variables nSubWidth and nSubHeight are derived as follows:
  If cIdx is equal to 0, nSubWidth is set to 1 and nSubHeight is set to 1.
  If startComp is equal to 1 and if cIdx>1, nSubWidth is set to 1 and nSubHeight is set to 1.
  Otherwise, nSubWidth is set to SubWidthC and nSubHeight is set to SubHeightC.
If cu_palette_ibc_flag is equal to 1, the following applies:
  The derivation process for the motion vectors as specified in clause 8.6.2 is invoked with a luma location (xCb, yCb) of the top-left sample of the current luma coding block relative to the top-left luma sample of the current picture, a variable cbWidth specifying the width of the current coding block in luma samples, and a variable cbHeight specifying the height of the current coding block in luma samples. The outputs are the luma motion vector in 1/16 fractional-sample accuracy mvL.
  The general IBC prediction process as specified in clause 8.6.3 is invoked with a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, variables numSbX and numSbY specifying the number of luma coding subblocks in horizontal and vertical direction, the motion vectors mv[xSbIdx][ySbIdx] with xSbIdx=0 . . . numSbX−1, and ySbIdx=0 . . . numSbY−1, a variable cIdx specifying the colour component index of the current block. The output is an array predSamples of prediction samples predSamples[x][y].
The (nTbW×nTbH) block of the reconstructed sample array recSamples at location (xCb, yCb) is represented by recSamples [x][y] with x=0 . . . nTbW−1 and y=0 . . . nTbH−1, and the value of recSamples[x][y] for each x in the range of 0 to nTbW−1, inclusive, and each v in the range of 0 to nTbH−1, inclusive, is derived as follows:
  The variables xL and yL are derived as follows:

$$xL = \text{palette\_transpose\_flag} ? x*n\text{SubHeight} : x*n\text{SubWidth} \quad (5\text{-}1)$$

$$yL = \text{palette tralnspose flag} ? y*n\text{SubWidth} : y*n\text{SubHeight} \quad (5\text{-}2)$$

The variable bIsEscapeSample is derived as follows:
   If PaletteIndexMap[xCb+xL][yCb+yL] is equal to MaxPaletteIndex and palette_escape_val_present_flag is equal to 1, bIsEscapeSample is set equal to 1.
   Otherwise, bIsEscapeSample is set equal to 0.
If bIsEscapeSample is equal to 0, the following applies:
   If cu_palette_ibc_flag is equal to 1, the following applies:
      If PaletteIndexMap[xCb+xL][yCb+yL] is equal to 0, the following applies:

recSamples[x][y]=predSamples[x][y]

Otherwise, the following applies:

recSamples[x][y]=CurrentPaletteEntries[cIdx][PaletteIndexMap[xCb+xL][yCb+yL]−1]    (5-3)

Otherwise, the following applies:

recSamples[x][y]=CurrentPaletteEntries[cIdx][PaletteIndexMap[xCb+xL][yCb+yL]]    (5-4)

Otherwise, if cu_transquant_bypass_flag is equal to 1, the following applies:

recSamples[x][y]=predSamples[x][y]+PaletteEscapeVal[cIdx][xCb+xL][yCb+yL]    (5-5)

Otherwise (bIsEscapeSample is equal to 1 and cu_transquant_bypass_flag is equal to 0), the following ordered steps apply:
1. The derivation process for quantization parameters is invoked with the location (xCb, yCb) specifying the top-left sample of the current block relative to the top-left sample of the current picture.
2. The quantization parameter qP is derived as follows:
   If cIdx is equal to 0, $qP=\mathrm{Max}(0, Qp'_Y)$    (5-6)

Otherwise, if cIdx is equal to 1, $qP=\mathrm{Max}(0, Qp'_{Cb})$    (5-7)

Otherwise (cIdx is equal to 2), $qP=\mathrm{Max}(0, Qp'_{Cr})$    (5-8)

3. The variables bitDepth is derived as follows:

$\mathrm{bitDepth}=(cIdx==0)?\mathrm{BitDepth}_Y:\mathrm{BitDepth}_C$    (5-9)

4. The list levelScale[ ] is specified as levelScale[k] = {40, 45, 51, 57, 64, 72} with k=0 . . . 5.
5. The following applies:
   If cu_palette_ibc_flag is equal to 1, the following applies tmpVal=(PaletteEscapeVal[cIdx][xCb+xL][yCb+yL] *levelScale[qP %6])<<(qP/6)+32)>>6    (5-10)

recSamples[x][y]=Clip3(0,(1<<bitDepth)−1,predSamples[x][y]+tmpVal)    (5-11)

Otherwise, if cu_palette_ibc_flag is equal to 0, the following applies tmpVal=(PaletteEscapeVal[cIdx][xCb+xL][yCb+yL] *levelScale[gP %6])<<(gP/6)+32)>>6    (5-10)

recSamples[x][y]=Clip3(0,(1<<bitDepth)−1,tmpVal)    (5-11)

Palette predictor update process for palette mode
Inputs to this process are:
   a location (xCb, yCb) specifying the top-left luma sample of the current block relative to the top-left luma sample of the current picture,
   a variable startComp specifies the first colour component in the palette table,
   a variable numComps specifies the number of colour components in the palette table,
Output of this process is a variable PredictorPaletteSize[startComp] specifying the size of the updated palette predictor, and an array PredictorPaletteEntries [cIdx][i], with cIdx=startComp, . . . , startComp+numComps−1, i=0 . . . PredictorPaletteSize−1 specifying the updated palette predictor for the next block.

The variable PredictorPaletteSize and the array PredictorPaletteEntries are derived or modified as follows:

--- for( i = 0; i < CurrentPaletteSize; i++)
   for( cIdx = startComp; cIdx < (startComp + numComps); cIdx++)
      newPredictorPaletteEntries[ cIdx ][ i ] = CurrentPaletteEntries[ cIdx ][ i ]
newPredictorPaletteSize = CurrentPaletteSize
for( i = 0; i < PredictorPaletteSize && newPredictorPaletteSize < PaletteMaxPredictorSize; i++)
   if( !PalettePredictorEntrvReuseFlaasi i 1 )
      for( cIdx = startComp; cIdx < (startComp +numComps); cIdx++)
         newPredictorPaletteEntries[ cIdx ][ newPredictorPaletteSize ] = PredictorPaletteEntries[ cIdx ][ i ]
      newPredictorPaletteSize++
   }
for( cIdx = startComp; cIdx < (startComp + numComps); cIdx++)
   for( i = 0; i < newPredictorPaletteSize; I++)
      PredictorPaletteEntries[ cIdx ][ i ] = newPredictorPaletteEntries[ cIdx ][ i ]
PredictorPaletteSize = newPredictorPaletteSize

---

It is a requirement of bitstream conformance that the value of PredictorPaletteSize shall be in the range of 0 to PaletteMaxPredictorSize, inclusive

TABLE 1

*Table 1 – Syntax elements and associated binarization.*

| Syntax structure | Syntax element | Binarization process | Input parameter |
|---|---|---|---|
| coding_unit() | cu_palette_ibc_fl ag | FL | cMax = 1 |

TABLE 2

Assignment of ctxInc to syntax elements with context coded bins

| | binIdx | | | | |
|---|---|---|---|---|---|
| Syntax eldment | 1 | 2 | 3 | 4 | >= 5 |
| cu palette0ibc_flag | na | na | na | na | na |

7. Embodiment Based on JVET-O2001-vE

Changes are highlighted by bolded, italicized, underlined text. Deleted texts are marked with ~~strikethrough~~.

Embodiment 1

7.3.8.5 Coding Unit Syntax

| coding_unit( x0, y0, cbWidth, cbHeight, cqtDepth, treeType, modeType ) { | Descriptor |
|---|---|
|   chType = treeType = = DUAL_TREE_CHROMA? 1 : 0 | |
|   if( slice_type != I \|\| sps_ibc_enabled_flag \|\| sps_palette_enabled_flag) { | |
|     ... | |
|     if( ( ( ( slice_type = = I \|\| ( cbWidth = = 4 && cbHeight = = 4 ) \|\| sps_ibc_enabled_flag ) && CuPredMode[ x0 ][ y0 ] = = MODE_INTRA ) \|\| | |
|       ( slice_type != I && !( cbWidth = = 4 && cbHeight = = 4 ) && !sps_ibc_enabled_flag && CuPredMode[ x0 ][ y0 ] != MODE_INTRA ) ) && sps_palette_enabled_flag && cbWidth <= 64 && cbHeight <= 64 && && cu_skip_flag[ x0 ][ y0 ] = = 0 && modeType != MODE_INTER ) | |
|       pred_mode_plt_flag | ae(v) |
|   } | |
|   if( CuPredMode[ chType ][ x0 ][ y0 ] = = MODE_INTRA \|\| | |
|     CuPredMode[ chType ][ x0 ][ y0 ] = = MODE_PLT ) { | |
|     if( treeType = = SINGLE_TREE \|\| treeType = = DUAL_TREE_LUMA ) { | |
|       if( pred_mode_plt_flag ) { | |
|         *if(cbWidth < 64 && cbHeight < 64* | |
|         *plt ibc flag* | *ae(v)* |
|       if( treeType = = DUAL_TREE_LUMA ) | |
|         palette_coding( x0, y0, cbWidth, cbHeight, 0, 1 ) | |
|       else /* SINGLE_TREE */ | |
|         palette_coding( x0, y0, cbWidth, cbHeight, 0, 3 ) | |
|     } else { | |
|       ... | |
|     } | |
|   ... | |
| } | | plt ibc flag specifies the use of palette mode in the current coding unit. plt_ibc_flag equal to 1 indicates that compound palette mode is applied in the current coding unit. plt_ibc_flag equal to 0 indicates that compound palette mode is not applied in the current coding unit. When plt_ibc_flag is not present, it is inferred to be equal to 0.

palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1.

The variable MaxPaletteIndex specifies the maximum possible value for a palette index for the current coding unit. The value of MaxPaletteIndex is set equal to CurrentPaletteSize[startComp]−1+palette_escape_val_present_flag+ (plt_ibc_flag?1:0).

8.4.5.3 Decoding Process for Palette Mode

Inputs to this process are:
- a location (xCb, yCb) specifying the top-left luma sample of the current block relative to the top-left luma sample of the current picture,
- a variable startComp specifies the first colour component in the palette table,
- a variable cIdx specifying the colour component of the current block,
- two variables nCbW and nCbH specifying the width and height of the current block, respectively.

Output of this process is an array recSamples[x][y], with x=0 ... nCbW−1, y=0 ... nCbH−1 specifying reconstructed sample values for the block.

Depending on the value of cIdx, the variables nSubWidth and nSubHeight are derived as follows:

If cIdx is equal to 0, nSubWidth is set to 1 and nSubHeight is set to 1.

Otherwise, nSubWidth is set to SubWidthC and nSubHeight is set to SubHeightC.

If plt_ibc_flag is equal to 1 the following applies:

The derivation process for IBC luma motion vector prediction as specified in clause 8.6.2.2 is invoked with the luma location (xCb, yCb), the variables cbWidth and cbHeight inputs, merge_idx[xCb][yCb] is set as the first valid BV merge index, and the output being the luma motion vector mvL.

The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0 ... numSbX−1, and ySbIdx=0 ... numSbY−1, the variable cIdx set equal to 0 as inputs, and the ibc prediction samples (predSamples) that are an (cbWidth)x (cbHeight) array predSamplesL of prediction luma samples as outputs.

It is a requirement of bitstream conformance that at least one merge index indicates a valid luma block vector bvL and the bvL shall obey the following constraints:

*Ctb*SizeY is greater than or equal to ((*yCb*+ (*bvL*[1]>>4)) & (*Ctb*SizeY−1))+*cb*Height.

IbcVirBuf[0][(x+(bvL[0]>>4)) & (IbcVirBufWidth−1)]
[(y+(bvL[1]>>4)) & (CtbSizeY−1)] shall not be
equal to −1 for x=xCb . . . xCb+cbWidth−1 and
y=yCb . . . yCb+cbHeight−1

The (nCbW×nCbH) block of the reconstructed sample array recSamples at location (xCb, yCb) is represented by recSamples[x][y] with x=0 . . . nCTbW−1 and y=0 . . . nCbH−1, and the value of recSamples[x][y] for each x in the range of 0 to nCbW−1, inclusive, and each y in the range of 0 to nCbH−1, inclusive, is derived as follows:
The variables xL and yL are derived as follows:

$xL$=palette_transpose_flag?$x*n$SubHeight:
 $x*n$SubWidth (8-268)

$yL$=palette_transpose_flag?$y*n$SubWidth:
 $y*n$SubHeight (8-269)

The variable bIsEscapeSample is derived as follows:
 If PaletteIndexMap[xCb+xL][yCb+yL] is equal to MaxPaletteIndex and palette_escape_val_present_flag is equal to 1, bIsEscapeSample is set equal to 1.
 Otherwise, bIsEscapeSample is set equal to 0.
If bIsEscapeSample is equal to 0, the following applies:
If plt_ibc_flag is 1, the following applies:

recSamples[x][y]=PaletteIndexMap[xCb+xL][yCb+
 yL]==0?predSamples[x][y]:

CurrentPaletteEntries[cIdx][PaletteIndexMap[xCb+
 xL][yCb+yL]−1]

Otherwise, the following applies:

recSamples[x][y]=CurrentPaletteEntries[cIdx][Pal-
 etteIndexMap[xCb+xL][yCb+yL]] (8-270)

It is a requirement of bitstream conformance that the value of PredictorPaletteSize[startComp] shall be in the range of 0 to PaletteMaxPredictorSize, inclusive.

8.6.2.2 Derivation Process for IBC Luma Block Vector Prediction
This process is only invoked when CuPredMode[0][xCb][yCb] is equal to MODE_IBC or pit ibc flap is 1, where (xCb, yCb) specify the top-left sample of the current luma coding block relative to the top-left luma sample of the current picture.
. . .
8.8.3.5 Derivation Process of Boundary Filtering Strength
Inputs to this process are:
 a picture sample array recPicture,
 a location (xCb, yCb) specifying the top-left sample of the current coding block relative to the top-left sample of the current picture,
 a variable nCbW specifying the width of the current coding block,
 a variable nCbH specifying the height of the current coding block,
 a variable edgeType specifying whether a vertical (EDGE_VER) or a horizontal
 (EDGE_HOR) edge is filtered,
 a variable cIdx specifying the colour component of the current coding block,
 a two-dimensional (nCbW)×(nCbH) array edgeFlags.
Output of this process is a two-dimensional (nCbW)×(nCbH) array bS specifying the boundary filtering strength.
. . .
For $xD_i$ with i=0 . . . xN and $yD_j$ with j=0 . . . yN, the following applies:
 If edgeFlags[$xD_i$][$yD_j$] is equal to 0, the variable bS[$xD_i$][$yD_j$] is set equal to 0.

Otherwise, the following applies:
. . .
The variable bS[$xD_i$][$yD_j$] is derived as follows:
. . .
 Otherwise, if cIdx is equal to 0 and one or more of the following conditions are true, bS[$xD_i$][$yD_j$] is set equal to 1:
  The coding subblock containing the sample $p_0$ and the coding subblock containing the sample $q_0$ are both coded in IBC prediction mode or their plt ibc flap are 1, and the absolute difference between the horizontal or vertical component of the block vectors used in the prediction of the two coding subblocks is greater than or equal to 8 in units of 1/16 luma samples.
  For the prediction of the coding subblock containing the sample $p_0$ different reference pictures or a different number of motion vectors are used than for the prediction of the coding subblock containing the sample $q_0$.
  NOTE 1—The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different.
  NOTE 2—The number of motion vectors that are used for the prediction of a coding subblock with top-left sample covering (xSb, ySb), is equal to PredFlagL0[xSb][ySb]+PredFlagL1[xSb][ySb].
. . .
 Otherwise, the variable bS[$xD_i$][$yD_j$] is set equal to 0.

6.4.4 Derivation Process for Neighbouring Block Availability
Inputs to this process are:
 the luma location (xCurr, yCurr) of the top-left sample of the current block relative to the top-left luma sample of the current picture,
 the luma location (xNbY, yNbY) covered by a neighbouring block relative to the top-left luma sample of the current picture,
 the variable checkPredModeY specifying whether availability depends on the prediction mode.
 the variable cIdx specifying the colour component of the current block.
Output of this process is the availability of the neighbouring block covering the location (xNbY, yNbY), denoted as availableN.
. . .
When all of the following conditions are true, availableN is set equal to FALSE.
 checkPredModeY is equal to TRUE.
 availableN is set equal to TRUE. ~~CuPredMode[0][xNbY][yNbY] is not equal to CuPredMode [0][xCurr][yCurr]~~
 All of the following conditions are false
  CuPredMode[0][xNbY][yNbY] is IBC, CuPredMode[0][xCurr][yCurr] is MODE PLT, and plt ibc flag[xCurr][yCurr] is 1
  CuPredMode[0][xNbY][yNbY] is MODE_PLT, plt_ibc_flag[xNbY][yNbY] is 1 and CuPredMode[0][xCurr][yCurr] is PLT CuPredMode[0][xNbY][yNbY] is equal to CuPredMode[0][xCurr][yCurr]

Embodiment 2

7.3.8.5 Coding Unit Syntax

| coding_unit( x0, y0, cbWidth, cbHeight, cqtDepth, treeType, modeType ) { | Descriptor |
|---|---|
| chType = treeType = = DUAL_TREE_CHROMA? 1 : 0 | |
| if( slice_type != I \|\| sps_ibc_enabled_flag \|\| sps_palette_enabled_flag ) { | |
| ... | |
| if( ( ( ( slice_type = = I \|\| ( cbWidth = = 4 && cbHeight = = 4 ) \|\| sps_ibc_enabled_flag ) && CuPredMode[ x0 ][ y0 ] = = MODE_INTRA ) \|\| ( slice_type != I && !( cbWidth = = 4 && cbHeight = = 4 ) && !sps_ibc_enabled_flag && CuPredMode[ x0 ][ y0 ] != MODE_INTRA ) ) && sps_palette_enabled_flag && cbWidth <= 64 && cbHeight <= 64 && && cu_skip_flag[ x0 ][ y0 ] = = 0 && modeType != MODE_INTER ) | |
| pred_mode_plt_flag | ae(v) |
| } | |
| if( CuPredMode[ chType ][ x0 ][ y0 ] = = MODE_INTRA \|\| CuPredMode[ chType ][ x0 ][ y0 ] = = MODE_PLT ) { | |
| if( treeType = = SINGLE_TREE \|\| treeType = = DUAL_TREE_LUMA ) { | |
| if( pred_mode_plt_flag ) { | |
| _if(cbWidth < 64 && cbHeight < 64)_ | |
| _plt ibc flag_ | _ae(v)_ |
| _if(plt_ibc_flag)_ | |
| _merge_idx[x0][y0]_ | _ae(v)_ |
| if( treeType = = DUAL_TREE_LUMA ) | |
| palette_coding( x0, y0, cbWidth, cbHeight, 0, 1 ) | |
| else /* SINGLE_TREE */ | |
| palette_coding( x0, y0, cbWidth, cbHeight, 0, 3 ) | |
| } else { | |
| ... | |
| } | |
| ... | |
| } | | plt_ibc_flag specifies the use of palette mode in the current coding unit. plt_ibc_flag equal to 1 indicates that compound palette mode is applied in the current coding unit. plt_ibc_flag equal to 0 indicates that compound palette mode is not applied in the current coding unit. When plt_ibc_flag is not present, it is inferred to be equal to 0.
palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1.
The variable MaxPaletteIndex specifies the maximum possible value for a palette index for the current coding unit. The value of MaxPaletteIndex is set equal to CurrentPaletteSize[startComp]−1+palette_escape_val_present_flag+ (plt_ibc_flap?1:0).

8.4.5.3 Decoding Process for Palette Mode

Inputs to this process are:
 a location (xCb, yCb) specifying the top-left luma sample of the current block relative to the top-left luma sample of the current picture,
 a variable startComp specifies the first colour component in the palette table,
 a variable cIdx specifying the colour component of the current block,
 two variables nCbW and nCbH specifying the width and height of the current block, respectively.

Output of this process is an array recSamples[x][y], with x=0 . . . nCbW−1, y=0 . . . nCbH−1 specifying reconstructed sample values for the block.

Depending on the value of cIdx, the variables nSubWidth and nSubHeight are derived as follows:

If cIdx is equal to 0, nSubWidth is set to 1 and nSubHeight is set to 1.
Otherwise, nSubWidth is set to SubWidthC and nSubHeight is set to SubHeightC.
If plt ibc flag is equal to 1 the following applies:
 The derivation process for IBC luma motion vector prediction as specified in clause 8.6.2.2 is invoked with the luma location (xCb, yCb), the variables cbWidth and cbHeight inputs, and the output being the luma motion vector mvL.
 The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0 . . . numSbX−1, and ySbIdx=0 . . . numSbY−1, the variable cIdx set equal to 0 as inputs, and the ibc prediction samples (predSamples) that are an (cbWidth)× (cbHeight) array predSamplesL of prediction luma samples as outputs.

The (nCbW×nCbH) block of the reconstructed sample array recSamples at location (xCb, yCb) is represented by recSamples[x][y] with x=0 . . . nCTbW−1 and y=0 . . . nCbH−1, and the value of recSamples[x][y] for each x in the range of 0 to nCbW−1, inclusive, and each y in the range of 0 to nCbH−1, inclusive, is derived as follows:

The variables xL and yL are derived as follows:

xL=palette_transpose_flag?x*nSubHeight:
    x*nSubWidth                                    (8-268)

yL=palette_transpose_flag?y*nSubWidth:
    y*nSubHeight                                   (8-269)

The variable bIsEscapeSample is derived as follows:
  If PaletteIndexMap[xCb+xL][yCb+yL] is equal to MaxPaletteIndex and palette_escape_val_present_flag is equal to 1, bIsEscapeSample is set equal to 1.
Otherwise, bIsEscapeSample is set equal to 0.
If bIsEscapeSample is equal to 0, the following applies:
If plt ibc flag is 1
  1. If PaletteIndexMap[xCb+xL][yCb+yL]==0 recSamples[x][y]=predSamples[x][y]

2. Otherwise, if PaletteIndexMap[xCb+xL][yCb+yL]>0 recSamples[x][y]=CurrentPaletteEntries[cIdx][PaletteIndexMap[xCb+xL][yCb+yL]−1]

Otherwise, if pit ibc flag is 0 recSamples[x][y]=CurrentPaletteEntries[cIdx][PaletteIndexMap[xCb+xL][yCb+yL]]   (8-270)

. . .

It is a requirement of bitstream conformance that the value of PredictorPaletteSize[startComp] shall be in the range of 0 to PaletteMaxPredictorSize, inclusive.

8.6.2.2 Derivation Process for IBC Luma Block Vector Prediction

This process is only invoked when CuPredMode[0][xCb][yCb] is equal to MODE_IBC or pit ibc flag is 1, where (xCb, yCb) specify the top-left sample of the current luma coding block relative to the top-left luma sample of the current picture.

. . .

8.8.3.5 Derivation Process of Boundary Filtering Strength
Inputs to this process are:
  a picture sample array recPicture,
  a location (xCb, yCb) specifying the top-left sample of the current coding block relative to the top-left sample of the current picture,
  a variable nCbW specifying the width of the current coding block,
  a variable nCbH specifying the height of the current coding block,
  a variable edgeType specifying whether a vertical (EDGE_VER) or a horizontal (EDGE_HOR) edge is filtered,
  a variable cIdx specifying the colour component of the current coding block,
  a two-dimensional (nCbW)x(nCbH) array edgeFlags.
Output of this process is a two-dimensional (nCbW)x(nCbH) array bS specifying the boundary filtering strength.

. . .

For $xD_i$ with i=0 . . . xN and $yD_j$ with j=0 . . . yN, the following applies:
  If edgeFlags[$xD_i$][$yD_j$] is equal to 0, the variable bS[$xD_i$][$yD_j$] is set equal to 0.

Otherwise, the following applies:

. . .

The variable bS[$xD_i$][$yD_j$] is derived as follows:

. . .

Otherwise, if cIdx is equal to 0 and one or more of the following conditions are true, bS[$xD_i$][$yD_j$] is set equal to 1:
    The coding subblock containing the sample $p_0$ and the coding subblock containing the sample $q_0$ are both coded in IBC prediction mode or their plt_ibc_flag are 1, and the absolute difference between the horizontal or vertical component of the block vectors used in the prediction of the two coding subblocks is greater than or equal to 8 in units of 1/16 luma samples.
    For the prediction of the coding subblock containing the sample $p_0$ different reference pictures or a different number of motion vectors are used than for the prediction of the coding subblock containing the sample $q_0$.
      NOTE 1—The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different.
      NOTE 2—The number of motion vectors that are used for the prediction of a coding subblock with top-left sample covering (xSb, ySb), is equal to PredFlagL0[xSb][ySb]+PredFlagL1[xSb][ySb].

. . .

Otherwise, the variable bS[$xD_i$][$yD_j$] is set equal to 0.

6.4.4 Derivation Process for Neighbouring Block Availability
Inputs to this process are:
  the luma location (xCurr, yCurr) of the top-left sample of the current block relative to the top-left luma sample of the current picture,
  the luma location (xNbY, yNbY) covered by a neighbouring block relative to the top-left luma sample of the current picture,
  the variable checkPredModeY specifying whether availability depends on the prediction mode.
  the variable cIdx specifying the colour component of the current block.
Output of this process is the availability of the neighbouring block covering the location (xNbY, yNbY), denoted as availableN.

. . .

When all of the following conditions are true, availableN is set equal to FALSE.
  checkPredModeY is equal to TRUE.
  availableN is set equal to TRUE. ~~CuPredMode[0][xNbY][yNbY] is not equal to CuPredMode [0][xCurr][yCurr]~~
  All of the following conditions are false
    CuPredMode[0][xNbY][yNbY] is IBC, CuPredMode[0][xCurr][yCurr] is MODE_PLT, and plt_ibc_flag[xCurr][yCurr] is 1

CuPredMode[0][xNbY][yNbY] is MODE PLT, plt ibc flag[xNbY][yNbY] is 1 and CuPredMode[0][xCurr][yCurr] is PLT
CuPredMode[0][xNbY][yNbY] is equal to CuPredMode[0][xCurr][yCurr]

7. Example Implementations of the Disclosed Technology

Figure 6:
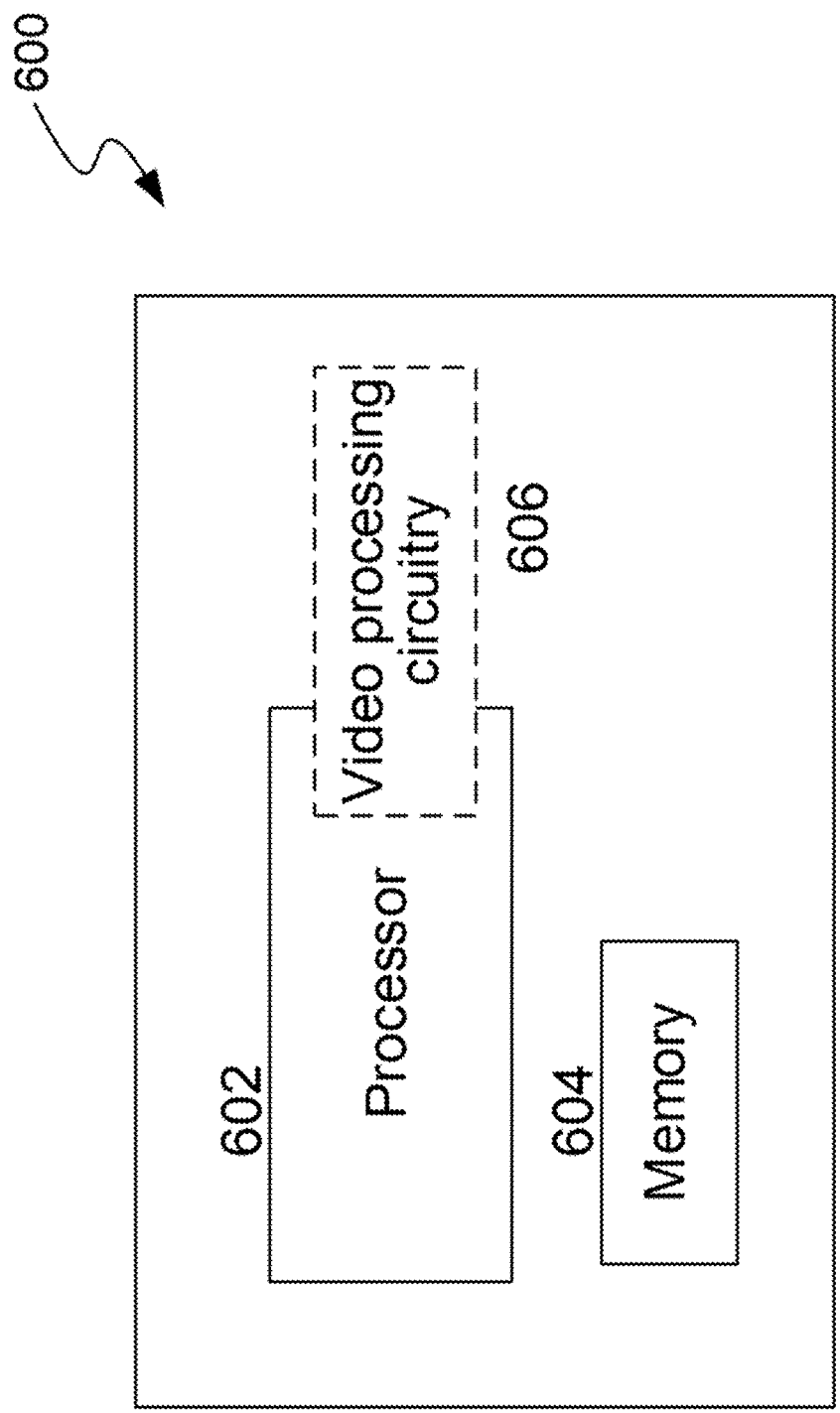
FIG. 6 is a block diagram of an example of a hardware platform for implementing a visual media decoding or a visual media encoding technique described in the present document.

FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods described in the present document. The memory (memories) 604 may be used for storing data and code used for implementing the methods and techniques described herein. The video processing hardware 606 may be used to implement, in hardware circuitry, some techniques described in the present document, and may be partly or completely be a part of the processors 602 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 7:
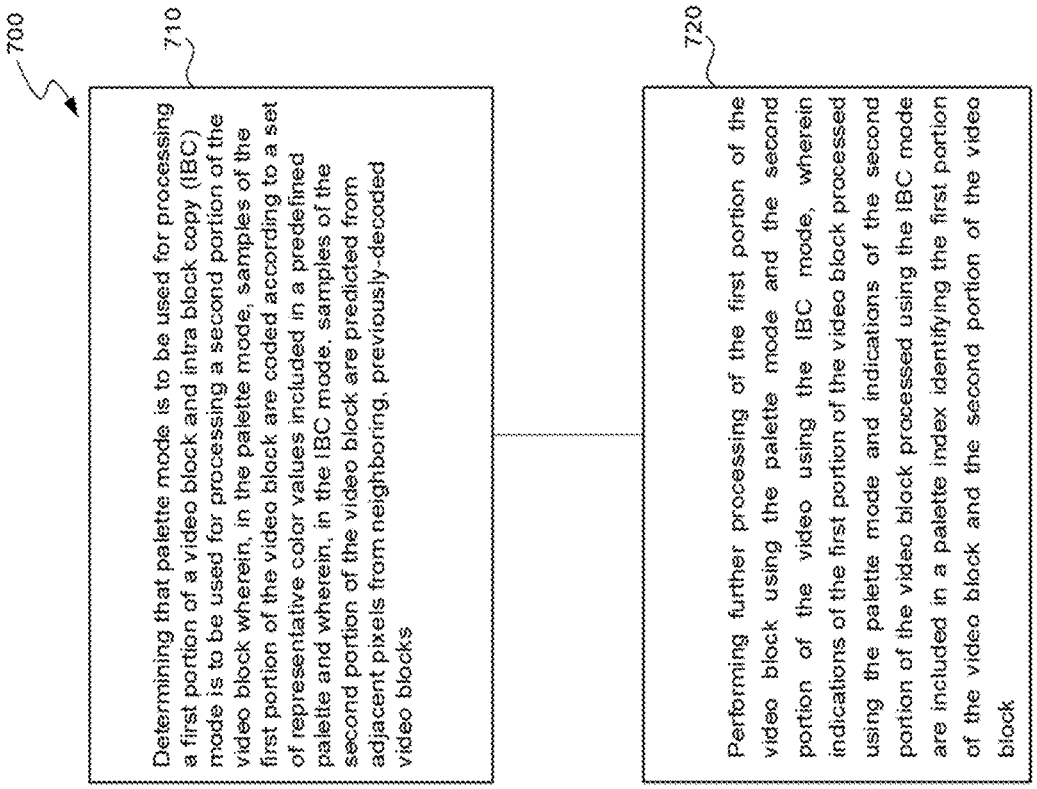
FIG. 7 shows a flowchart of an example method for video coding.

FIG. 7 is a flowchart for an example method 700 of video processing. The method 700 includes, at 710, determining that palette mode is to be used for processing a first portion of a video block and intra block copy (IBC) mode is to be used for processing a second portion of the video block wherein, in the palette mode, samples of the first portion of the video block are coded according to a set of representative color values included in a predefined palette and wherein, in the IBC mode, samples of the second portion of the video block are predicted from adjacent pixels from neighboring, previously-decoded video blocks. The method includes, at 720, performing further processing of the first portion of the video block using the palette mode and the second portion of the video using the IBC mode, wherein indications of the first portion of the video block processed using the palette mode and indications of the second portion of the video block processed using the IBC mode are included in a palette index identifying the first portion of the video block and the second portion of the video block.

Some embodiments may be described using the following clause-based format.

1. A method for processing video, comprising:
determining that palette mode is to be used for processing a first portion of a video block and intra block copy (IBC) mode is to be used for processing a second portion of the video block wherein, in the palette mode, samples of the first portion of the video block are coded according to a set of representative color values included in a predefined palette and wherein, in the IBC mode, samples of the second portion of the video block are predicted from adjacent pixels from neighboring, previously-decoded video blocks; and
performing further processing of the first portion of the video block using the palette mode and the second portion of the video using the IBC mode, wherein indications of the first portion of the video block processed using the palette mode and indications of the second portion of the video block processed using the IBC mode are included in a palette index identifying the first portion of the video block and the second portion of the video block.

2. The method of clause 1, wherein processing the first portion of the video block includes copying collocated samples from the second portion of the video block.

3. The method of clause 2, wherein copying collocated samples from the second portion of the video block is in accordance with the palette index included in an index map.

4. The method of any one or more of clauses 2-3, wherein the palette index is 0.

5. The method of any one or more of clauses 2-3, wherein the palette index is equal to one less than a total number of palette entries.

6. The method of any one or more of clauses 2-3, wherein the palette index is equal to an integer value based on one or more of: a dimension of the video block, a quantization parameter of the video block, a quantization parameter of the video block, a color format of the video block, a coding tree structure of the video block, a picture/group/slice type of the video block, or a parameter included in a bitstream representation associated with conversion of the video block.

7. The method of any one or more of clauses 2-3, wherein the palette index identifying the first portion of the video block and the second portion of the video block is signaled as a flag denoted plt_combined_ibc_sample_flag of the video block.

8. The method of clause 7, wherein a value of plt_combined_ibc_sample_flag equals one.

9. The method of clause 7, wherein plt_combined_ibc_sample_flag of the video block is based on values of plt_combined_ibc_sample_flag flags of the neighboring samples of the video block.

10. The method of clause 7, wherein plt_combined_ibc_sample_flag of the video block is inferred to be zero when the neighboring samples of the video block are non-existent.

11. The method of clause 9, wherein the neighboring samples of the video block include a spatially left neighbor of the video block and a spatially above member of the video block.

12. The method of clause 11, wherein plt_combined_ibc_sample_flag of the video block is one, and wherein the spatially left neighbor of the video block and the spatially above member of the video block both have plt_combined_ibc_sample_flag flags of one.

13. The method of clause 1, wherein the second portion of the video block processed using the IBC mode is based at least in part on a motion information derived from (i) an IBC merge mode or (ii) an IBC advanced motion vector prediction (AMVP) mode, wherein, in the IBC merge mode, an index pointing to an entry in an IBC merge candidates list is parsed from a bitstream representation associated with conversion of the video block, and wherein, in the IBC AMVP mode, an index pointing to an IBC AMVP list is parsed from the bitstream representation associated with conversion of the video block.

14. The method of clause 13, wherein a height of the video block and/or a width of the video block exceed a threshold value.

15. The method of clause 14, wherein the threshold value is based at least on one or more of: a dimension of the video block, a quantization parameter of the video block, a quantization parameter of the video block, a color format of the video block, a coding tree structure of the video block, a picture/group/slice type of the video block, or a parameter included in the bitstream representation associated with conversion of the video block.

16. The method of clause 13, wherein the second portion of the video block processed using the IBC mode is based at least in part on the motion information derived always from the IBC merge mode.

17. The method of clause 13, wherein the second portion of the video block processed using the IBC mode is based at least in part on the motion information derived always from the IBC AMVP mode.

18. The method of clause 17, wherein in the IBC AMVP mode, the entry in the IBC merge candidates list corresponds to a first entry in the IBC merge candidates list.

19. The method of clause 13, further comprising:
in response to determining that a dual coding tree structure of the video block is enabled, wherein the motion information in the IBC mode includes chroma motion vectors or luma motion vectors, wherein, based on a chroma format of the second portion of the video block, the chroma motion vectors are derived by any one or more of: (a) scaling collocated luma motion vectors, (b) scaling neighboring motion vectors of collocated luma blocks, or (c) averaging, for each chroma sub-block, available luma motion vectors.

20. The method of any one or more of clauses 2-3, wherein the indications of the second portion of the video block processed using the IBC mode include an indication of copying collocated samples from the second portion of the video block, wherein the indication of copying collocated samples from the second portion of the video block is based on one or more of: a dimension of the video block, a quantization parameter of the video block, a quantization parameter of the video block, a color format of the video block, a coding tree structure of the video block, or a picture/group/slice type of the video block.

21. The method of any one or more of clauses 2-3, wherein the first portion of the video block includes escape pixels, wherein, for the escape pixels, a residue obtained from computing a difference between original samples of the first block and of the collocated samples from the second portion of the video block is signaled in a bitstream representation associated with conversion of the video block.

22. The method of clause 21, wherein the residue is quantized according to a quantization parameter, and wherein the quantized residue is signaled in the bitstream representation associated with conversion of the video block.

23. The method of clause 22, wherein the quantized residue includes a positive or a negative sign, wherein the positive or the negative sign is signaled in the bitstream representation associated with conversion of the video block.

24. The method of any one or more of clauses 1-23, wherein information identifying an associated method is included in a video parameter set (VPS), a sequence parameter set (SPS), a picture parameter set (PPS), an adaptation parameter set (APS), a picture header, a tile group header, a tile header, a slice header, or a largest coding unit (LCU) row.

25. The method of clause 24, wherein the information defined for the video block is based on one or more of: a dimension of the video block, a quantization parameter of the video block, a quantization parameter of the video block, a color format of the video block, a coding tree structure of the video block, or a picture/group/slice type of the video block, values of palette flags indicating the palette mode of one or more neighboring samples of the video block, and values of intra block copy flags indicating the IBC mode of one or more neighboring samples of the video block.

26. The method of clause 25, wherein values of the palette flags correspond to a Boolean true or false, indicating that the palette mode is enabled or disabled.

27. The method of clause 25, wherein values of the intra block copy flags correspond to a Boolean true or false, indicating that the IBC mode is enabled or disabled.

28. The method of any one or more of clauses 24-27, wherein the values of the palette flags and/or the values of the intra block copy flags are signaled in the bitstream representation associated with conversion of the video block.

29. The method of any one or more of clauses 24-27, wherein the values of the palette flags and/or the values of the intra block copy flags are computed or inferred.

30. The method of any one or more of clauses 24-29, wherein the information defined for the video block includes a prediction mode, wherein the prediction mode is MODE_IBC, MODE_INTRA, or MODE_INTER, respectively corresponding to the IBC mode, an intra mode, or an inter mode.

31. The method of one or more of clauses 1-23, wherein the first portion of the video block and/or the second portion of the video block correspond to a sub-block further comprising:
selectively enabling or disabling the palette mode and/or the IBC mode to be used on the sub-block.

32. The method of clause 31, wherein the sub-block is a 4×4 luma block or a 2×2 chroma block.

33. The method of clause 31, wherein the intra block copy (IBC) mode is to be used prior to the palette mode.

34. The method of clause 31, wherein the palette mode is used on a current chroma sub-block if a collocated luma block of the current chroma sub-block is not coded in IBC mode 35. The method of clause 31, wherein the palette mode is used on a current chroma sub-block if an IBC prediction block of the current chroma sub-block is not reconstructed.

36. The method of clause 31, wherein the selectively enabling or disabling is based, at least in part, on a prediction mode of a collocated luma block of the sub-block.

37. The method of clause 31, wherein the selectively enabling of the IBC mode for the sub-block includes copying a collocated sample in IBC prediction and the selectively disabling of the IBC mode for the sub-block includes reconstructing the sub-block using palette colors.

38. The method of clause 31, wherein a size of the sub-block is based on one or more of the following: a dimension of the video block, a quantization parameter of the video block, the palette index, one or more intra block copy (IBC) flags of neighboring blocks of the video block, a color format of the video block, a coding tree structure of the sub-block, a slice/group/picture type of the sub-block.

39. A method for processing video, comprising:
determining, for samples of a video block, that palette mode and intra block copy (IBC) mode are to be used for processing the samples, wherein, in the palette mode, the samples of the video block are coded according to a set of representative color values included in a predefined palette and wherein, in the IBC mode, the samples of the video block are predicted from adjacent pixels from neighboring, previously-decoded video blocks, wherein the samples of the video bock are associated with an index.

40. A video decoding apparatus comprising a processor configured to implement a method recited in one or more of clauses 1 to 39.

41. A video encoding apparatus comprising a processor configured to implement a method recited in one or more of clauses 1 to 39.

42. A computer program product having computer code stored thereon, the code, when executed by a processor, causes the processor to implement a method recited in any of clauses 1 to 39.

43. A method, apparatus or system described in the present document.

Figure 10:
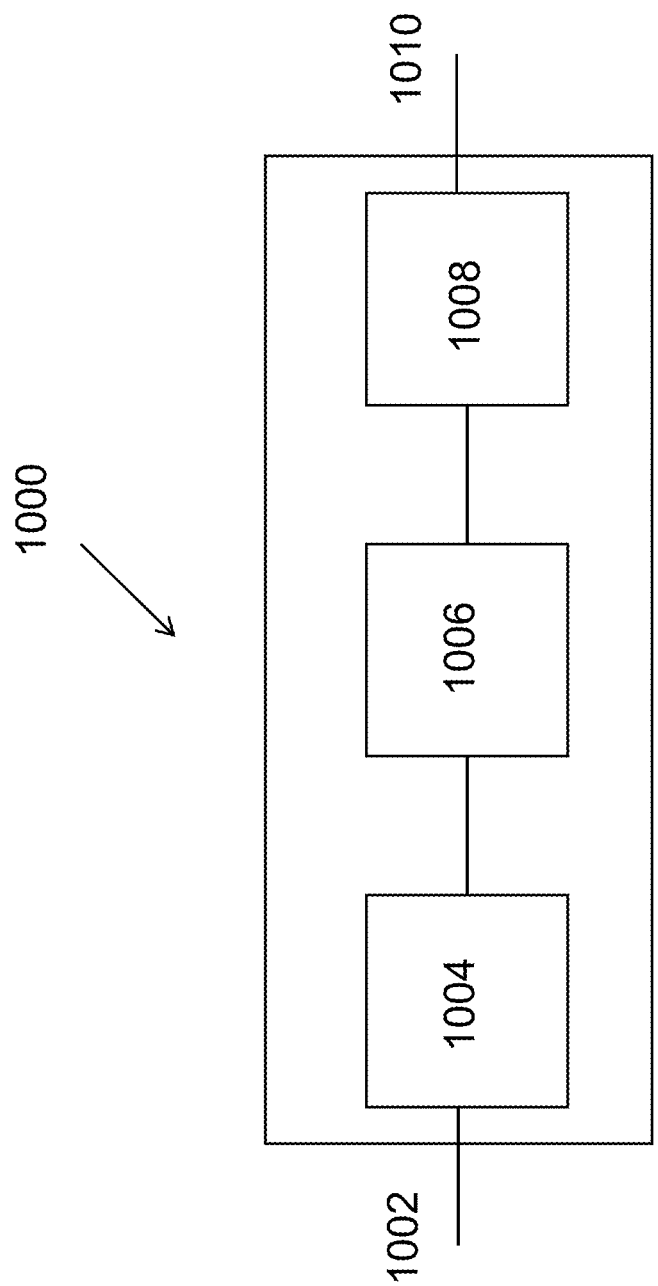
FIG. 10 is a block diagram of an example video processing system in which disclosed techniques may be implemented.

FIG. 10 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

FIG. 11 is a flowchart of an example method of visual data processing. At step 1102, the process determines, for a conversion between a video block of visual media data and a bitstream representation of the video block, that palette mode is to be used for processing a first portion of the video block and intra block copy (IBC) mode is to be used for processing a second portion of the video block wherein, in the palette mode, samples of the first portion of the video block are coded according to a set of representative color values included in a predefined palette and wherein, in the IBC mode, samples of the second portion of the video block are predicted from adjacent pixels from neighboring, previously-decoded video blocks. At step 1104, the process performs, during the conversion, further processing of the first portion of the video block using the palette mode and further processing of the second portion of the video block based on a prediction block derived using the IBC mode, wherein indications of the first portion of the video block processed using the palette mode and indications of the second portion of the video block processed using the IBC mode are included in a palette index map that identifies the first portion of the video block and the second portion of the video block.

Figure 12:
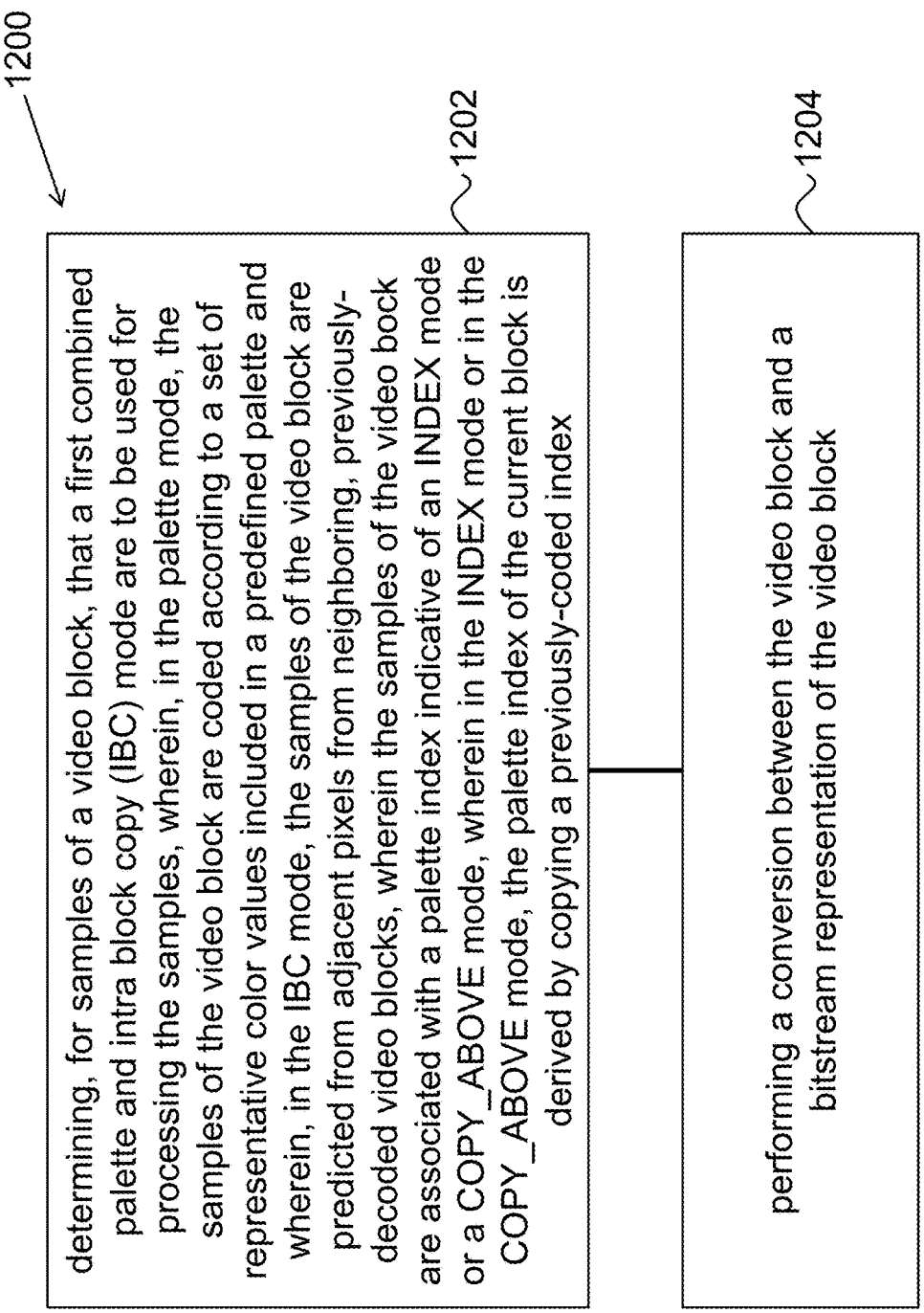
FIG. 12 is a flowchart of an example method of visual data processing.

FIG. 12 is a flowchart of an example method of visual data processing. At step 1202, the process determines, for samples of a video block, that a first combined palette and intra block copy (IBC) mode are to be used for processing the samples, wherein, in the palette mode, the samples of the video block are coded according to a set of representative color values included in a predefined palette and wherein, in the IBC mode, the samples of the video block are predicted from adjacent pixels from neighboring, previously-decoded video blocks, wherein the samples of the video bock are associated with a palette index indicative of an INDEX mode or a COPY_ABOVE mode, wherein in the INDEX mode or in the COPY_ABOVE mode, the palette index of the current block is derived by copying a previously-coded index. At step 1204, the process performs a conversion between the video block and a bitstream representation of the video block.

Some embodiments of the present disclosure are presented in clause-based format.

1. A method for visual media processing, comprising:
determining, for a conversion between a video block of visual media data and a bitstream representation of the video block, that palette mode is to be used for processing a first portion of the video block and intra block copy (IBC) mode is to be used for processing a second portion of the video block wherein, in the palette mode, samples of the first portion of the video block are coded according to a set of representative color values included in a predefined palette and wherein, in the IBC mode, samples of the second portion of the video block are predicted from adjacent pixels from neighboring, previously-decoded video blocks; and performing, during the conversion, further processing of the first portion of the video block using the palette mode and further processing of the second portion of the video block based on a prediction block derived using the IBC mode, wherein indications of the first portion of the video block processed using the palette mode and indications of the second portion of the video block processed using the IBC mode are included in a palette index map that identifies the first portion of the video block and the second portion of the video block.

2. The method of clause 1, wherein further processing of the second portion of the video block includes:

reconstructing samples of the second portion of the video block by copying collocated samples in the prediction block derived using the IBC mode.

3. The method of clause 1, wherein a palette index included in the palette index map indicates whether a sample belongs to the first portion of the video block or the second portion of the video block.

4. The method of any one or more of clauses 2-3, wherein the palette index of a sample belonging to the second portion of the video block is set to 0.

5. The method of any one or more of clauses 2-3, wherein an actual palette index of a sample belonging to the first portion is equal to one less than a decoded palette index.

6. The method of any one or more of clauses 2-3, wherein the palette index is equal to an integer value based on one or more of: a dimension of the video block, a quantization parameter of the video block, a quantization parameter of the video block, a color format of the video block, a coding tree structure of the video block, a picture/group/slice type of the video block, or a parameter included in the bitstream representation associated with conversion of the video block.

7. The method of any one or more of clauses 1 and 3, wherein the palette index identifying the first portion of the video block and the second portion of the video block is signaled as a flag denoted by plt_combined_ibc_sample_flag of the video block.

8. The method of any one or more of clauses 2-3, wherein samples of the second portion of the video block are added as new entries in a palette predictor, wherein the palette predictor maintains a list of samples that make use of the palette.

9. The method of any one or more of clauses 2-3, wherein samples of the second portion of the video block are used to replace existing entries in a palette predictor, wherein the palette predictor maintains a list of coded samples that make use of the palette.

10. The method of any one or more of clauses 2-3, wherein samples of the second portion of the video block are added as new entries in a palette predictor, wherein the palette predictor maintains a list of samples that make use of the palette, and wherein, after addition, the list of samples in the palette predictor is reordered.

11. The method of clause 7, wherein a value of plt_combined_ibc_sample_flag equals one when a sample belongs to the second portion of the video block.

12. The method of clause 7, wherein plt_combined_ibc_sample_flag of the video block is based on values of plt_combined_ibc_sample_flag flags of the neighboring samples of the video block.

13. The method of clause 7, wherein plt_combined_ibc_sample_flag of the video block is inferred to be zero when the neighboring samples of the video block are non-existent.

14. The method of clause 12, wherein the neighboring samples of the video block include a spatially left neighbor of the video block and a spatially above neighbor of the video block.

15. The method of clause 11, wherein plt combined ibc sample flag of the video block is one, and wherein the spatially left neighbor of the video block and the spatially above neighbor of the video block both have plt combined ibc sample flag flags of one.

16. The method of clause 1, wherein the second portion of the video block processed using the IBC mode is based at least in part on a motion information derived from (i) an IBC merge mode or (ii) an IBC advanced motion vector prediction (AMVP) mode, wherein, in the IBC merge mode, an index pointing to an entry in an IBC merge candidates list is parsed from a bitstream representation associated with conversion of the video block, and wherein, in the IBC AMVP mode, an index pointing to an IBC AMVP list is parsed from the bitstream representation associated with the conversion of the video block.

17. The method of clause 16, wherein a height of the video block and/or a width of the video block exceed a threshold value.

18. The method of clause 17, wherein the threshold value is based at least on one or more of: a dimension of the video block, a quantization parameter of the video block, a quantization parameter of the video block, a color format of the video block, a coding tree structure of the video block, a picture/group/slice type of the video block, or a parameter included in the bitstream representation associated with conversion of the video block.

19. The method of clause 16, wherein the second portion of the video block is processed only using the prediction block derived using the IBC merge mode.

20. The method of clause 16, wherein the second portion of the video block is processed only using the prediction block derived using the IBC AMVP mode.

21. The method of clause 16, wherein the second portion of the video block is processed using the prediction block derived by a motion candidate in a history-based motion vector prediction (HMVP) table.

22. The method of clause 19, wherein the index of an IBC merge candidate used by the prediction block for the second portion of the video block is included as a field in the bitstream representation associated with conversion of the video block.

23. The method of clause 22, wherein indexes of invalid entries in the IBC merge candidates list are excluded from being signaled in the bitstream representation.

24. The method of clause 20, wherein a block vector difference between the motion information of the prediction block for the second portion of the video block and an entry in the IBC AMVP list is included as a field in the bitstream representation associated with conversion of the video block.

25. The method of clause 19, wherein a first valid candidate in the IBC merge candidates list is used to derive the prediction block, wherein a valid candidate satisfies a condition that an entirety of a reference block is within an available reconstructed area.

26. The method of clause 19, wherein a first valid candidate in the IBC AMVP list is used to derive the prediction block, wherein a valid candidate satisfies a condition that an entirety of a reference block is within an available reconstructed area.

27. The method of clause 20, wherein in the IBC AMVP mode, further comprising:

upon determining that all entries in the IBC merge candidates list is invalid, using default motion information.

28. The method of clause 27, wherein the default motion information is based at least in part on a dimension of the video block or a location of the video block.

29. The method of clause 27, wherein the default motion information is predefined.

30. The method of clause 16, further comprising:

in response to determining that a dual coding tree structure of the video block is enabled, wherein the motion information in the IBC mode includes chroma motion vectors or luma motion vectors, wherein, based on a chroma format of the second portion of the video block, the chroma motion vectors are derived by any one or more of: (a) scaling collocated luma motion vectors, (b) scaling neighboring motion vectors of collocated luma blocks, or (c) averaging, for each chroma sub-block, available luma motion vectors.

31. The method of any one or more of clauses 2-30, wherein the indications of the second portion of the video block processed using the IBC mode is based on one or more of: a dimension of the video block, a quantization parameter of the video block, a quantization parameter of the video block, a color format of the video block, a coding tree structure of the video block, or a picture/group/slice type of the video block.

32. The method of any one or more of clauses 2-3, wherein the first portion of the video block includes escape pixels, wherein, for the escape pixels, a residue obtained from computing a difference between the samples of the first portion of the video block and the samples of the second portion of the video block is signaled in a bitstream representation associated with the conversion of the video block.

33. The method of any one or more of clauses 2-3, wherein the first portion of the video block includes escape pixels, wherein, for the escape pixels, a residue obtained from computing a difference between the samples of the first portion of the video block and the reconstructed samples of the second portion of the video block is signaled in a bitstream representation associated with the conversion of the video block.

34. The method of clause 33, wherein the residue is quantized according to a quantization parameter, and wherein the quantized residue is signaled in the bitstream representation associated with the conversion of the video block.

35. The method of clause 34, wherein the quantized residue includes a positive or a negative sign, wherein the positive or the negative sign is signaled in the bitstream representation associated with the conversion of the video block.

36. The method of one or more of clauses 1-35, wherein the first portion of the video block and/or the second portion of the video block correspond to a sub-block further comprising:
selectively enabling or disabling the palette mode and/or the IBC mode to be used on the sub-block.

37. The method of clause 36, wherein the sub-block is a 4×4 luma block or a 2×2 chroma block.

38. The method of clause 36, wherein the intra block copy (IBC) mode is used prior to the palette mode.

39. The method of clause 36, wherein the palette mode is used on a current chroma sub-block if the current chroma sub-block is not coded in IBC mode.

40. The method of clause 36, wherein the palette mode is used on a current chroma sub-block if a collocated luma block of the current chroma sub-block is not coded in IBC mode.

41. The method of clause 36, wherein the palette mode is used on a current chroma sub-block if an IBC prediction block of the current chroma sub-block is not reconstructed.

42. The method of clause 36, wherein the selectively enabling or disabling is based, at least in part, on a prediction mode of a collocated luma block of the sub-block.

43. The method of clause 36, wherein the selectively enabling of the IBC mode for the sub-block includes copying a collocated sample in IBC prediction and the selectively disabling of the IBC mode for the sub-block includes reconstructing the sub-block using palette colors.

44. The method of clause 36, wherein indications of usage of the palette mode and/or the IBC mode is signaled at sub-block level.

45. The method of clause 44, wherein a flag associated with the sub-block is included in the bitstream representation to indicate whether the sub-block is coded in the palette mode or in the IBC mode.

46. The method of clause 43, wherein a flag associated with the video block is included in the bitstream representation to indicate whether the video block is coded in the palette mode or in the IBC mode, further comprising:
selectively enabling or disabling the palette mode and/or the IBC mode to be used on a first color component of the sub-block is based on information from a second color component of the sub-block.

47. The method of clause 36, wherein a size of the sub-block is based on one or more of the following: a dimension of the video block, a quantization parameter of the video block, the palette index, one or more intra block copy (IBC) flags of neighboring blocks of the video block, a color format of the video block, a coding tree structure of the sub-block, a slice/group/picture type of the sub-block.

48. A method for visual media processing, comprising:
determining, for samples of a video block, that a first combined palette and intra block copy (IBC) mode are to be used for processing the samples, wherein, in the palette mode, the samples of the video block are coded according to a set of representative color values included in a predefined palette and wherein, in the IBC mode, the samples of the video block are predicted from adjacent pixels from neighboring, previously-decoded video blocks, wherein the samples of the video bock are associated with a palette index indicative of an INDEX mode or a COPY_ABOVE mode, wherein in the INDEX mode or in the COPY_ABOVE mode, the palette index of the current block is derived by copying a previously-coded index; and
performing a conversion between the video block and a bitstream representation of the video block.

49. The method of clause 48, wherein the sample of the video block coded in the IBC mode is inferred to have a special index.

50. The method of clause 49, wherein, in the INDEX mode and/or the COPY_ABOVE mode, a value of the special index is based on other palette indices.

51. The method of clause 49, wherein, in the INDEX mode and/or the COPY_ABOVE mode, a sample in a first portion of the video block is prevented from copying a sample from a second portion of the video block.

52. The method of clause 49, wherein a sample coded in the IBC mode is skipped when the palette index of the sample indicates the INDEX and/or the COPY_ABOVE mode.

53. The method of clause 48, further comprising:
determining, for samples of a video block, that a second combined palette and intra prediction mode are to be used for processing the samples using a prediction block generated based on the intra prediction mode and the palette index.

54. The method of clause 48, wherein in the first combined palette mode and intra block copy (IBC) mode, further comprising:
applying a constraint-based rule that specifies at least one valid motion information derived from (i) an IBC merge mode or (ii) an IBC advanced motion vector prediction (AMVP) mode.

55. The method of any one or more of clauses 1-53, wherein information identifying an associated method is included in a video parameter set (VPS), a sequence parameter set (SPS), a picture parameter set (PPS), an adaptation parameter set (APS), a picture header, a tile group header, a tile header, a slice header, or a largest coding unit (LCU) row.

56. The method of clause 55, wherein the information defined for the video block is based on one or more of: a dimension of the video block, a quantization parameter of the video block, a quantization parameter of the video block, a color format of the video block, a coding tree structure of the video block, or a picture/group/slice type of the video block, values of palette flags indicating the palette mode of one or more neighboring samples of the video block, values of intra block copy flags indicating the IBC mode of one or more neighboring samples of the video block, values of the first combined mode flags indicating the combined palette and intra block copy mode of one or more neighboring samples of the video block, and values of the second combined mode flags indicating the combined palette and intra mode of one or more neighboring samples of the video block.

57. The method of clause 54, wherein, when the dimension of the video block exceeds a threshold quantity, the information identifying the associated method is excluded from the bitstream representation.

58. The method of clause 56, wherein values of the palette flags correspond to a Boolean true or false, indicating that the palette mode is enabled or disabled.

59. The method of clause 56, wherein values of the intra block copy flags correspond to a Boolean true or false, indicating that the IBC mode is enabled or disabled.

60. The method of clause 56, wherein values of the first combined mode flags correspond to a Boolean true or false, indicating that the first combined palette and intra block copy mode is disabled or enabled.

61. The method of clause 56, wherein values of the second combined mode flags correspond to a Boolean true or false, indicating that the second combined palette and intra mode is disabled or enabled.

62. The method of clause 56, wherein the information defined for the video block includes a prediction mode, wherein the prediction mode is MODE_IBC, MODE_INTRA, or MODE_INTER, respectively corresponding to the IBC mode, an intra mode, or an inter mode.

63. The method of any one or more of clauses 58-61, wherein the values of the palette flags and/or the values of the intra block copy flags and/or the values of the first combined mode flags and/or the values of the second combined mode flags are signaled in the bitstream representation associated with the conversion of the video block.

64. The method of any one or more of clauses 58-61, wherein the values of the palette flags and/or the values of the intra block copy flags and/or the values of the first combined mode flags and/or the values of the second combined mode flags are computed or inferred.

65. The method of any one or more of clauses 58-61, wherein, in the bitstream representation, the values of the palette flags are signaled prior to the values of the first and second combined mode flags and the values of the intra block copy flags.

66. The method of any one or more of clauses 58-61, wherein, in the bitstream representation, the values of the palette flags, the values of the intra block copy flags, and the values of the first and second combined mode flags are signaled in accordance with an order.

67. The method of any one or more of clauses 58-61, wherein a first flag and a second flag associated with the video block is included in the bitstream representation, wherein the first flag indicates a use of the first combined mode and the second flag indicates a use of the second combined mode, and wherein the first flag is computed or inferred from the second flag.

68. The method of any one or more of clauses 58-61, wherein usage of the palette mode is signaled with a first indication and usage of the first and/or second combined modes is signaled with a second indication.

69. The method of clause 67, wherein the first flag and/or the second flag included in the bitstream representation are signaled using bypass-coded bins or context-coded bins based on arithmetic coding.

70. The method of clause 69, wherein a context of the first flag and/or a context of the second flag is based on one or more neighboring blocks of the video block.

71. The method of clause 69, wherein a context of the first flag and/or a context of the second flag is based on a coded information associated with the one or more neighboring blocks of the video block.

72. The method of any one or more of clauses 68-71, wherein the one or more neighboring blocks of the video block are located left of the video block and/or above the video block.

73. The method of clause 72, wherein a context of the video block, denoted ctxInc, is computed as ctxInc= (cu_left_ibc_palette_mode? 1:0)+(cu_above_ibc_palette_mode? 1:0), where cu_left_ibc_palette_mode and cu_above_ibc_palette_mode are contexts of a neighboring left block and above block respectively.

74. The method of clause 71, wherein a context of the video block, denoted ctxInc, is computed as ctxInc= (cu_left_ibc_palette_mode? 1:0)*2+(cu_above_ibc_palette_mode? 1:0), where cu_left_ibc_palette_mode and cu_above_ibc_palette_mode are contexts of a neighboring left block and above block respectively.

75. The method of any one or more of clauses 69-73, wherein a context of a neighboring block is set to a default value if the neighboring block is unavailable.

76. The method of clause 75, wherein the default value is zero.

77. The method of clause 71, wherein a context of the first flag and/or a context of the second flag is based on coded information of the video block.

78. The method of clause 77, wherein the coded information includes a dimension of the video block or a partitioning process associated with the video block.

79. The method of clause 78, wherein the partitioning process associated with the video block includes one of: a quad-tree partitioning, a binary partitioning, or a ternary tree partitioning.

80. The method of any of clauses 1-79, wherein the conversion includes generating the bitstream representation from the current video block.

81. The method of any of clauses 1-79, wherein the conversion includes generating pixel values of the current video block from the bitstream representation.

82. A video encoder apparatus comprising a processor configured to implement a method recited in any one or more of clauses 1-79.

83. A video decoder apparatus comprising a processor configured to implement a method recited in any one or more of clauses 1-79.

84. A computer readable medium having code stored thereon, the code embodying processor-executable instructions for implementing a method recited in any of or more of clauses 1-79.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing video data, comprising:
   determining, for a conversion between a video block of the video data and a bitstream of the video block, that palette mode is to be used for processing a first portion of the video block and intra block copy (IBC) mode is to be used for processing a second portion of the video block, wherein, in the palette mode, samples of the first portion of the video block are coded according to a set of representative color values included in a predefined palette and wherein, in the IBC mode, samples of the second portion of the video block are predicted from adjacent pixels from neighboring, previously-decoded video blocks using motion information; and performing, during the conversion, further processing of the first portion of the video block using the palette mode and further processing of the second portion of the video block based on a prediction block derived using the IBC mode, wherein the further processing of the second portion of the video block includes reconstructing samples of the second portion of the video block by copying collocated samples derived using the IBC mode, wherein indications of the first portion of the video block processed using the palette mode and indications of the second portion of the video block processed using the IBC mode are included in a palette index map that identifies the first portion of the video block and the second portion of the video block, wherein a palette index included in the palette index map indicates whether a sample belongs to the first portion of the video block or the second portion of the video block, and wherein the first portion of the video block includes escape pixels, and wherein, for the escape pixels, residuals are obtained from computing differences between the samples of the first portion of the video block and collocated prediction samples using the IBC mode or an intra mode.

2. The method of claim 1, wherein the palette index of a sample belonging to the second portion of the video block is set to 0.

3. The method of claim 1, wherein an actual palette index of a sample belonging to the first portion is equal to one less than a decoded palette index.

4. The method of claim 1, wherein the palette index is equal to an integer value based on one or more of: a dimension of the video block, a quantization parameter of the video block, a color format of the video block, a coding tree structure of the video block, a picture/group/slice type of the video block, or a parameter included in the bitstream associated with the conversion of the video block.

5. The method of claim 1, wherein indications identifying the first portion of the video block and the second portion of the video block are signaled as a syntax element flag.

6. The method of claim 5, wherein a value of the syntax element flag is derived based on neighboring samples of the video block.

7. The method of claim 1, wherein the conversion includes encoding the video block into the bitstream.

8. The method of claim 1, wherein the conversion includes decoding the video block from the bitstream.

9. An apparatus for processing video data, wherein the apparatus comprises:
a processor; and
a non-transitory memory with instructions stored thereon, wherein the instructions, upon execution by the processor, cause the processor to:
determine, for a conversion between a video block of the video data and a bitstream of the video block, that palette mode is to be used for processing a first portion of the video block and intra block copy (IBC) mode is to be used for processing a second portion of the video block, wherein, in the palette mode, samples of the first portion of the video block are coded according to a set of representative color values included in a predefined palette and wherein, in the IBC mode, samples of the second portion of the video block are predicted from adjacent pixels from neighboring, previously-decoded video blocks using motion information; and perform, during the conversion, further processing of the first portion of the video block using the palette mode and further processing of the second portion of the video block based on a prediction block derived using the IBC mode, wherein the performing of the further processing of the second portion of the video block includes reconstructing samples of the second portion of the video block by copying collocated samples derived using the IBC mode, wherein indications of the first portion of the video block processed using the palette mode and indications of the second portion of the video block processed using the IBC mode are included in a palette index map that identifies the first portion of the video block and the second portion of the video block, wherein a palette index included in the palette index map indicates whether a sample belongs to the first portion of the video block or the second portion of the video block, and wherein the first portion of the video block includes escape pixels, and wherein, for the escape pixels, residuals are obtained from computing differences between the samples of the first portion of the video block and collocated prediction samples using the IBC mode or an intra mode.

10. The apparatus of claim 9, wherein the palette index of a sample belonging to the second portion of the video block is set to 0.

11. The apparatus of claim 9, wherein an actual palette index of a sample belonging to the first portion is equal to one less than a decoded palette index.

12. A non-transitory computer-readable recording medium storing a bitstream of a video which is generated by a method performed by a video processing apparatus, wherein the method comprises:
determining that palette mode is to be used for processing a first portion of a video block and intra block copy (IBC) mode is to be used for processing a second portion of the video block, wherein, in the palette mode, samples of the first portion of the video block are coded according to a set of representative color values included in a predefined palette and wherein, in the IBC mode, samples of the second portion of the video block are predicted from adjacent pixels from neighboring, previously-decoded video blocks using motion information;

performing further processing of the first portion of the video block using the palette mode and further processing of the second portion of the video block based on a prediction block derived using the IBC mode, wherein the further processing of the second portion of the video block includes reconstructing samples of the second portion of the video block by copying collocated samples derived using the IBC mode; and generating the bitstream based on the performing,
wherein indications of the first portion of the video block processed using the palette mode and indications of the second portion of the video block processed using the IBC mode are included in a palette index map that identifies the first portion of the video block and the second portion of the video block, wherein a palette index included in the palette index map indicates whether a sample belongs to the first portion of the video block or the second portion of the video block, and wherein the first portion of the video block includes escape pixels, wherein, for the escape pixels, residuals are obtained from computing differences between the samples of the first portion of the video block and collocated prediction samples using the IBC mode or an intra mode.

13. The non-transitory computer-readable recording medium of claim 12, wherein the palette index of a sample belonging to the second portion of the video block is set to 0.

* * * * *